United States Patent
Raghavan et al.

(10) Patent No.: US 11,412,458 B2
(45) Date of Patent: Aug. 9, 2022

(54) POWER CONTROL TECHNIQUES FOR ULTRA-WIDE BANDWIDTH BEAMFORMING SYSTEMS

(71) Applicant: QUALCOMM Incorporated, San Diego, CA (US)

(72) Inventors: Vasanthan Raghavan, West Windsor Township, NJ (US); Sony Akkarakaran, Poway, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/113,762

(22) Filed: Dec. 7, 2020

(65) Prior Publication Data
US 2022/0182948 A1 Jun. 9, 2022

(51) Int. Cl.
*H04W 52/24* (2009.01)
*H04W 52/14* (2009.01)
*H04B 17/309* (2015.01)

(52) U.S. Cl.
CPC ........ *H04W 52/242* (2013.01); *H04B 17/309* (2015.01); *H04W 52/146* (2013.01)

(58) Field of Classification Search
CPC ..... H04L 5/003; H04L 5/0094; H04L 5/0048; H04W 52/242; H04W 52/146;
(Continued)

(56) References Cited

U.S. PATENT DOCUMENTS

| | | | |
|---|---|---|---|
| 2008/0123602 A1* | 5/2008 | Beek .................... | H04B 7/0695 370/336 |
| 2009/0285195 A1* | 11/2009 | Chen ................... | H04W 72/048 370/344 |

(Continued)

FOREIGN PATENT DOCUMENTS

| EP | 3592048 A1 | 1/2020 |
|---|---|---|
| WO | WO-2010015286 A1 | 2/2010 |

OTHER PUBLICATIONS

International Search Report and Written Opinion—PCT/US2021/056429—ISA/EPO—Mar. 2, 2022 (208296WO).
(Continued)

*Primary Examiner* — John J Lee
(74) *Attorney, Agent, or Firm* — Holland & Hart LLP

(57) ABSTRACT

Methods, systems, and devices for wireless communication are described that provide for measuring one or more reference signals on one or more sub-bands of a wide-bandwidth communications frequency band. A user equipment (UE) may measure a path loss of a first frequency sub-band of a set of frequency sub-bands, and may determine an estimated path loss for a second frequency sub-band based on the measured path loss of the first frequency sub-band. A transmission power for the second frequency sub-band may be determined based on the estimated path loss for the second frequency sub-band, and a transmission using the second frequency sub-band may use the determined transmission power. The UE may maintain multiple transmitter power control (TPC) loops for multiple sub-bands, and power control commands for the first frequency sub-band may be used for one or more other sub-bands that are associated with the first sub-band.

30 Claims, 20 Drawing Sheets

(58) Field of Classification Search
CPC .... H04W 52/54; H04W 24/08; H04B 17/309; H04B 7/0617
USPC ................................ 455/522, 69, 452.1, 509
See application file for complete search history.

(56) References Cited

U.S. PATENT DOCUMENTS

2017/0294945 A1* 10/2017 Liu ...................... H04B 7/0626
2017/0332390 A1* 11/2017 Li ....................... H04W 52/383

OTHER PUBLICATIONS

Qualcomm Incorporated: "Discussion on UL Power Control for LTE-A", 3GPP Draft, 3GPP TSG-RAN WG4 #54, R4-100812, 3rd Generation Partnership Project (3GPP), Mobile Competence Centre, 650, Route Des Lucioles, F-06921 Sophia-Antipolis Cedex, France, vol. Ran WG4, No. San Francisco, USA, Feb. 22, 2010, Feb. 22-26, 2010, Feb. 19, 2010 (Feb. 19, 2010), 4 Pages, XP050426210, [Retrieved on Feb. 19, 2010] Paragraph 2.2, Paragraph 2.3.

\* cited by examiner

POWER CONTROL TECHNIQUES FOR ULTRA-WIDE BANDWIDTH BEAMFORMING SYSTEMS

FIELD OF TECHNOLOGY

The following relates to wireless communication, including power control techniques for ultra-wide bandwidth beamforming systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power control techniques for ultra-wide bandwidth beamforming systems. Various aspects are described that provide for measuring one or more reference signals on one or more sub-bands of a wide-bandwidth communications frequency band, and setting power control parameters for transmissions on one or more other sub-bands that may not contain a reference signal. In some cases, a user equipment (UE) may measure a path loss of a first frequency sub-band of a set of frequency sub-bands, and may determine an estimated path loss for a second frequency sub-band based on the measured path loss of the first frequency sub-band. A transmission power for the second frequency sub-band may be determined based on the estimated path loss for the second frequency sub-band, and a transmission using the second frequency sub-band may use the determined transmission power. In some cases, the UE may maintain multiple transmitter power control (TPC) loops for multiple sub-bands, and power control commands for the first frequency sub-band may be used for one or more other sub-bands that are associated with the first sub-band. Additionally or alternatively, the UE may report a power headroom for a second frequency sub-band based at least in part on a first uplink shared channel power for the first frequency sub-band.

A method for wireless communication at a UE is described. The method may include identifying a set of multiple frequency sub-bands for communications with a base station and a first frequency sub-band of the set of multiple frequency sub-bands as a measurement sub-band, measuring, responsive to the identifying, at least a first reference signal on the first frequency sub-band, setting a first transmission power for the first frequency sub-band and a second transmission power for a second frequency sub-band of the set of multiple frequency sub-bands based on the measuring the first reference signal on the first frequency sub-band, and transmitting, at the second transmission power, one or more uplink communications to the base station on the second frequency sub-band.

An apparatus for wireless communication at a UE is described. The apparatus may include a processor, memory in electronic communication with the processor, and instructions stored in the memory. The instructions may be executable by the processor to cause the apparatus to identify a set of multiple frequency sub-bands for communications with a base station and a first frequency sub-band of the set of multiple frequency sub-bands as a measurement sub-band, measure, responsive to the identifying, at least a first reference signal on the first frequency sub-band, set a first transmission power for the first frequency sub-band and a second transmission power for a second frequency sub-band of the set of multiple frequency sub-bands based on the measuring the first reference signal on the first frequency sub-band, and transmit, at the second transmission power, one or more uplink communications to the base station on the second frequency sub-band.

Another apparatus for wireless communication at a UE is described. The apparatus may include means for identifying a set of multiple frequency sub-bands for communications with a base station and a first frequency sub-band of the set of multiple frequency sub-bands as a measurement sub-band, means for measuring, responsive to the identifying, at least a first reference signal on the first frequency sub-band, means for setting a first transmission power for the first frequency sub-band and a second transmission power for a second frequency sub-band of the set of multiple frequency sub-bands based on the measuring the first reference signal on the first frequency sub-band, and means for transmitting, at the second transmission power, one or more uplink communications to the base station on the second frequency sub-band.

A non-transitory computer-readable medium storing code for wireless communication at a UE is described. The code may include instructions executable by a processor to identify a set of multiple frequency sub-bands for communications with a base station and a first frequency sub-band of the set of multiple frequency sub-bands as a measurement sub-band, measure, responsive to the identifying, at least a first reference signal on the first frequency sub-band, set a first transmission power for the first frequency sub-band and a second transmission power for a second frequency sub-band of the set of multiple frequency sub-bands based on the measuring the first reference signal on the first frequency sub-band, and transmit, at the second transmission power, one or more uplink communications to the base station on the second frequency sub-band.

Some examples of the method, apparatuses, and non-transitory computer-readable medium described herein may further include operations, features, means, or instructions for determining a first path loss of the first frequency sub-band based on the measuring the first reference signal and determining an estimated path loss for at least the second frequency sub-band based on the first path loss of the first frequency sub-band. In some examples of the method, apparatuses, and non-transitory computer-readable medium described herein, the one or more uplink communications include one or more of an uplink shared channel communication, an uplink control channel communication, a sounding reference signal communication, or any combinations thereof, that are scheduled on the second frequency sub-band.

In some examples of the method, apparatuses, and non-transitory computer-readable medium described herein, the first frequency sub-band is in a first subset of the set of multiple frequency sub-bands that are measurement sub-bands, and the second frequency sub-band is in a second subset of the set of multiple frequency sub-bands that is non-overlapping with the first subset of frequency sub-bands and where measurements associated with the first frequency sub-band may be used to estimate one or more power parameters for the second frequency sub-band and measurements associated with a third frequency sub-band of the first subset of frequency sub-bands may be used to estimate one or more power parameters for a fourth frequency sub-band of the second subset of frequency sub-bands. Some examples of the method, apparatuses, and non-transitory computer-readable medium described herein may further include operations, features, means, or instructions for determining a first path loss compensation parameter for the first frequency sub-band and a second path loss compensation parameter for the second frequency sub-band based on one or more measurements of the first reference signal. Some examples of the method, apparatuses, and non-transitory computer-readable medium described herein may further include operations, features, means, or instructions for initiating multiple closed-loop power control processes that are each associated with a respective frequency sub-band of the set of multiple frequency sub-bands, and where a transmit power of each of the set of multiple frequency sub-bands is set based on the corresponding closed-loop power control process.

In some examples of the method, apparatuses, and non-transitory computer-readable medium described herein, the UE accumulates received transmit power control (TPC) commands into the closed-loop power control process associated with the frequency sub-band in which an uplink communication is scheduled. In some examples of the method, apparatuses, and non-transitory computer-readable medium described herein, the received TPC commands include an indication of one or more of the multiple closed-loop power control processes to which the TPC command is to be applied. In some examples of the method, apparatuses, and non-transitory computer-readable medium described herein, the indication in the TPC commands indicates, based on the frequency sub-band in which the TPC command is received, that an associated TPC is to be applied to each of the set of multiple closed-loop power control processes, to a subset of the set of multiple closed-loop power control processes, or to one or more default closed-loop power control processes.

Some examples of the method, apparatuses, and non-transitory computer-readable medium described herein may further include operations, features, means, or instructions for determining a second uplink shared channel power for the second frequency sub-band based on a first uplink shared channel power for an uplink communication in the first frequency sub-band and reporting a power headroom to the base station for the second frequency sub-band based on the determined second uplink shared channel power. In some examples of the method, apparatuses, and non-transitory computer-readable medium described herein, the second uplink shared channel power may be determined based on a set of configured default parameters and the first uplink shared channel power for the uplink communication in the first frequency sub-band. In some examples of the method, apparatuses, and non-transitory computer-readable medium described herein, the second uplink shared channel power may be determined based on a resource allocation of the uplink communication in the first frequency sub-band being applied to the second frequency sub-band.

A method for wireless communication at a base station is described. The method may include transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands, transmitting a first reference signal on a first frequency sub-band of the first subset of frequency sub-bands, and receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

An apparatus for wireless communication at a base station is described. The apparatus may include a processor, memory in electronic communication with the processor, and instructions stored in the memory. The instructions may be executable by the processor to cause the apparatus to transmit configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands, transmit a first reference signal on a first frequency sub-band of the first subset of frequency sub-bands, and receive one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

Another apparatus for wireless communication at a base station is described. The apparatus may include means for transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands, means for transmitting a first reference signal on a first frequency sub-band of the first subset of frequency sub-bands, and means for receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

A non-transitory computer-readable medium storing code for wireless communication at a base station is described. The code may include instructions executable by a processor to transmit configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands, transmit a first reference signal on a first frequency sub-band of the first subset of frequency sub-bands, and receive one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

In some examples of the method, apparatuses, and non-transitory computer-readable medium described herein, the configuration information further indicates that a first path loss of the first frequency sub-band is to be used to estimate a second path loss for at least the second frequency sub-band. In some examples of the method, apparatuses, and non-transitory computer-readable medium described herein, the one or more uplink communications include one or more of an uplink shared channel communication, an uplink control channel communication, a sounding reference signal communication, or any combinations thereof, that are scheduled on the second frequency sub-band.

In some examples of the method, apparatuses, and non-transitory computer-readable medium described herein, the configuration information indicates that measurements associated with the first frequency sub-band may be used to estimate one or more power parameters for the second frequency sub-band and measurements associated with a third frequency sub-band of the first subset of frequency sub-bands may be used to estimate one or more power parameters for a fourth frequency sub-band of the second subset of frequency sub-bands. In some examples of the method, apparatuses, and non-transitory computer-readable medium described herein, the configuration information indicates that a first path loss compensation parameter for the first frequency sub-band and a second path loss compensation parameter for the second frequency sub-band are to be based on one or more measurements of the first reference signal.

In some examples of the method, apparatuses, and non-transitory computer-readable medium described herein, the configuration information further provides for initiation of a set of multiple closed-loop power control processes at the UE that are each associated with a respective frequency sub-band of the set of multiple frequency sub-bands, and where a transmit power of each of the set of multiple frequency sub-bands is set based on the corresponding closed-loop power control process. In some examples of the method, apparatuses, and non-transitory computer-readable medium described herein, the configuration information further provides that the UE accumulates received TPC commands into the closed-loop power control process associated with the frequency sub-band in which an uplink communication is scheduled. In some examples of the method, apparatuses, and non-transitory computer-readable medium described herein, the TPC commands include an indication of one or more of the set of multiple closed-loop power control processes to which the TPC command is to be applied. In some examples of the method, apparatuses, and non-transitory computer-readable medium described herein, the indication in the TPC commands indicates, based on the frequency sub-band in which the TPC command is received, that an associated TPC is to be applied to each of the set of multiple closed-loop power control processes, to a subset of the set of multiple closed-loop power control processes, or to one or more default closed-loop power control processes.

Some examples of the method, apparatuses, and non-transitory computer-readable medium described herein may further include operations, features, means, or instructions for receiving, from the UE, a power headroom report for the second frequency sub-band that is based on a first uplink shared channel power for an uplink communication in the first frequency sub-band. In some examples of the method, apparatuses, and non-transitory computer-readable medium described herein, the configuration information further includes a set of configured default parameters for determining a second uplink shared channel power based on the first uplink shared channel power for the first frequency sub-band. In some examples of the method, apparatuses, and non-transitory computer-readable medium described herein, the second uplink shared channel power may be determined based on a resource allocation of an uplink communication in the first frequency sub-band being applied to the second frequency sub-band.

DETAILED DESCRIPTION

Figure 1:
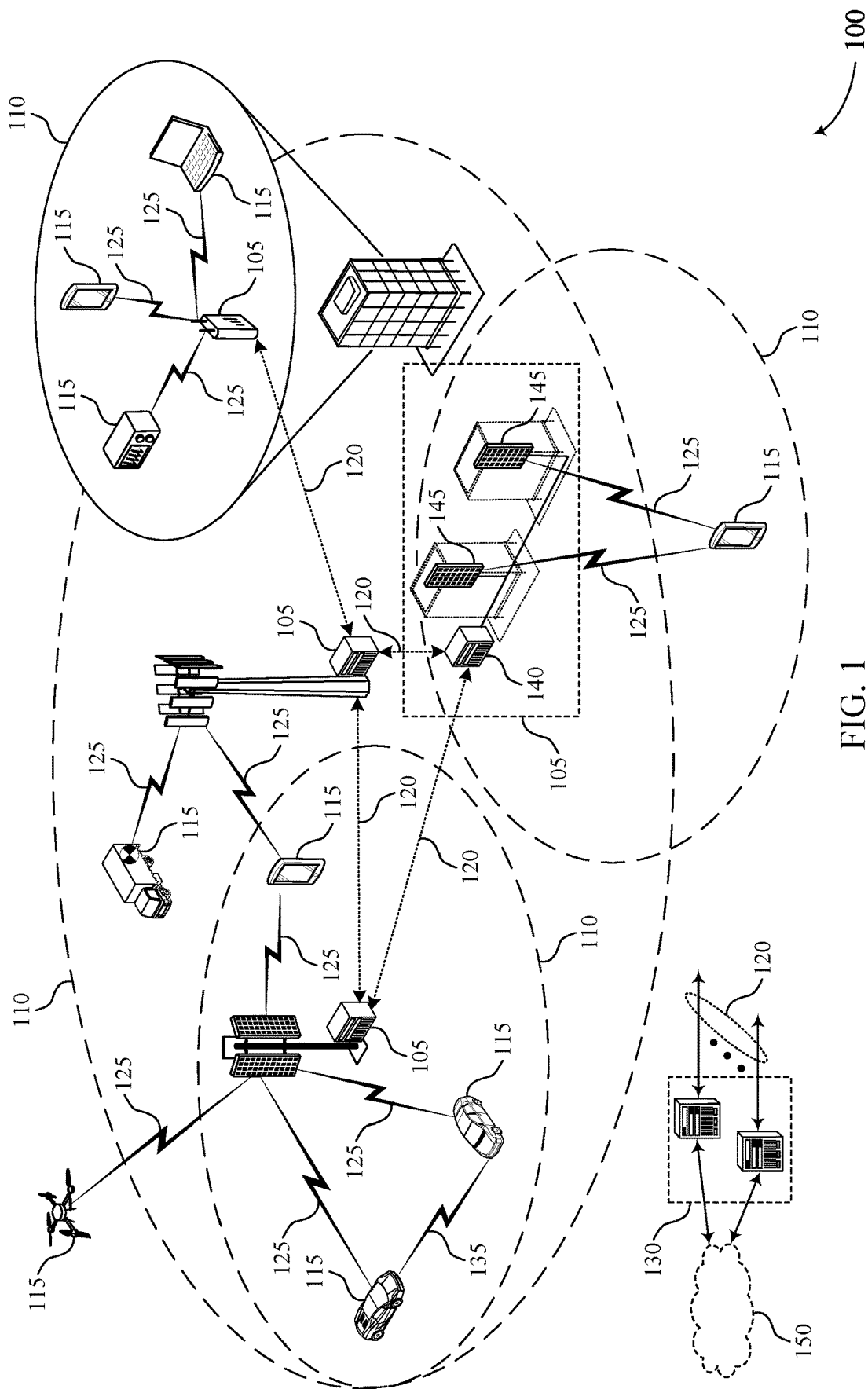
FIG. 1 illustrates an example of a wireless communications system that supports power control techniques for ultra-wide bandwidth beamforming systems in accordance with aspects of the present disclosure.

In some wireless communications systems, a base station and a user equipment (UE) may communicate using relatively high frequencies using a relatively wide frequency bandwidth. For example, in some cases a base station and UE may use what is often referred to as ultra-wide bandwidths in a high frequency band of 52.6 GHz to 114.25 GHz (which may be referred to as frequency range 4 (FR4), upper millimeter wave bands, or sub-THz regime). In some cases, a communications bandwidth in such frequency ranges may be 14 GHz (e.g., which may be referred to as ultra-wide bandwidth), with 2 GHz channel bandwidths, which may provide seven (7) frequency sub-bands within the 14 GHz bandwidth. Communications between the UE and base station may use one or more channelization over one or more of the frequency sub-bands, and the channelization may be changed between frequency sub-bands in a dynamic or semi-persistent manner. Further, in some cases, a device may use multiple channelizations in a carrier aggregation (CA) framework for some communications. In some cases, a relatively small number of RF chains may be used to support the ultra-wide bandwidth regime, and analog/RF beamforming with a limited set of phase shifters and gain control stages may result in significant beamforming performance loss (e.g., which may be referred to as beam squinting). In such cases, reference signals (e.g., path loss reference signals (PL-RSs) such as a channel state information reference signal (CSI-RS)) that span multiple frequency sub-bands may result in relatively poor path loss estimations due to channel impulse response (CIR) distortions as well as beam squinting that may dominate over ultra-wide bandwidth operation. Further, transmission of a separate PL-RS in each sub-band may result in a substantial increase in overhead.

In accordance with various aspects of the present disclosure, techniques are described that provide for measuring one or more reference signals on one or more frequency sub-bands of a wide-bandwidth or ultra-wide bandwidth frequency band, and setting power control parameters for transmissions on one or more other sub-bands that may not contain a reference signal. In some cases, a UE may measure a path loss of a first frequency sub-band of a set of frequency sub-bands, and may determine an estimated path loss for a second frequency sub-band based on the measured path loss of the first frequency sub-band. For example, a first PL-RS (e.g., a CSI-RS) in the first frequency sub-band may be used to measure the path loss of the first frequency sub-band, and the estimated path loss for the second frequency sub-band may be determined based on the measured path loss of the first frequency sub-band. A transmission power for the second frequency sub-band may be determined based on the estimated path loss for the second frequency sub-band, and a transmission using the second frequency sub-band may use the determined transmission power. In some cases, the UE may initiate and maintain multiple transmitter power control (TPC) loops for multiple sub-bands, and power control commands for the first frequency sub-band may be used for one or more other sub-bands that are associated with the first sub-band. Additionally or alternatively, the UE may report a power headroom for a second frequency sub-band based at least in part on a first uplink shared channel power for the first frequency sub-band.

In some cases, a base station may configure a UE to measure path loss only on one or more specified sub-bands, and uplink power control for other sub-bands used for uplink communications (e.g., physical uplink shared channel (PUSCH) transmissions, physical uplink control channel (PUCCH) transmissions, sounding reference signal (SRS) transmissions, or any combinations thereof) may be determined based on the measurements on the specified sub-bands. In some cases, the UE may maintain separate path loss compensation parameters (e.g., $\alpha(j)$) for each different sub-band. Further, separate closed-loop power control processes may be maintained for each different sub-band, and transmitter power control (TPC) commands may be accumulated separately for each sub-band based on TPCs for scheduled sub-bands and one or more other sub-bands that are associated with the scheduled sub-bands. Additionally or alternatively, a power headroom (PHR) may be reported based on a PUSCH power for a sub-band that is determined based on an uplink power and parameters of a different sub-band.

Particular aspects of the subject matter described herein may be implemented to realize one or more potential advantages. The described techniques may be implemented to realize enhanced communications between wireless devices transmitting or receiving communications via one or more sub-bands of a relatively wide bandwidth. For example, based on implementing the described power control techniques, a UE may use measurements of a first frequency sub-band to determine power parameters for a different frequency sub-band, where a PL-RS may be transmitted in the first frequency sub-band and not in the second frequency sub-band. Such techniques may result in determination of power control parameters for multiple sub-bands based on a reference signal transmitted in one of the sub-bands, thus reducing overhead relative to transmission of separate reference signals in each sub-band and increasing the amount of information transferred relative to a system that does not use such techniques. Further, based on transmission power determination based on measurements of the first sub-band, more reliable measurements may be obtained with a reduced likelihood of CIR distortions or distortions due to beam squinting issues, and the UE and base station may experience increased reliability and a greater likelihood of successful communication. Additionally, based on implementing the use of power control techniques as discussed herein, wireless devices may achieve higher data rates and denser communication networks.

Aspects of the disclosure are initially described in the context of wireless communications systems. Aspects of the disclosure are further illustrated by and described with reference to sub-band illustrations, process flows, apparatus diagrams, system diagrams, and flowcharts that relate to power control techniques for ultra-wide bandwidth beamforming systems.

FIG. 1 illustrates an example of a wireless communications system 100 that supports power control techniques for ultra-wide bandwidth beamforming systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth. As discussed herein, in some ultra-wide bandwidth deployments (e.g., FR4 deployments that use ultra-wide bandwidth), carriers may be transmitted using a 2 GHz sub-band within a 14 GHz bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a base station 105 and a UE 115 may operate in a relatively wide bandwidth (e.g., an ultra-wide FR4 bandwidth), and the UE 115 may measure one or more reference signals in a first frequency sub-band and use the measurement to set power control parameters for transmissions on a different frequency sub-band. In some cases, the UE 115 may maintain multiple TPC loops for multiple sub-bands, and power control commands for the first frequency sub-band may be used for one or more other sub-bands that are associated with the first frequency sub-band. Additionally or alternatively, the UE 115 may report a power headroom for a second frequency sub-band based at least in part on a first uplink shared channel (e.g., PUSCH) power for the first frequency sub-band.

Figure 2:
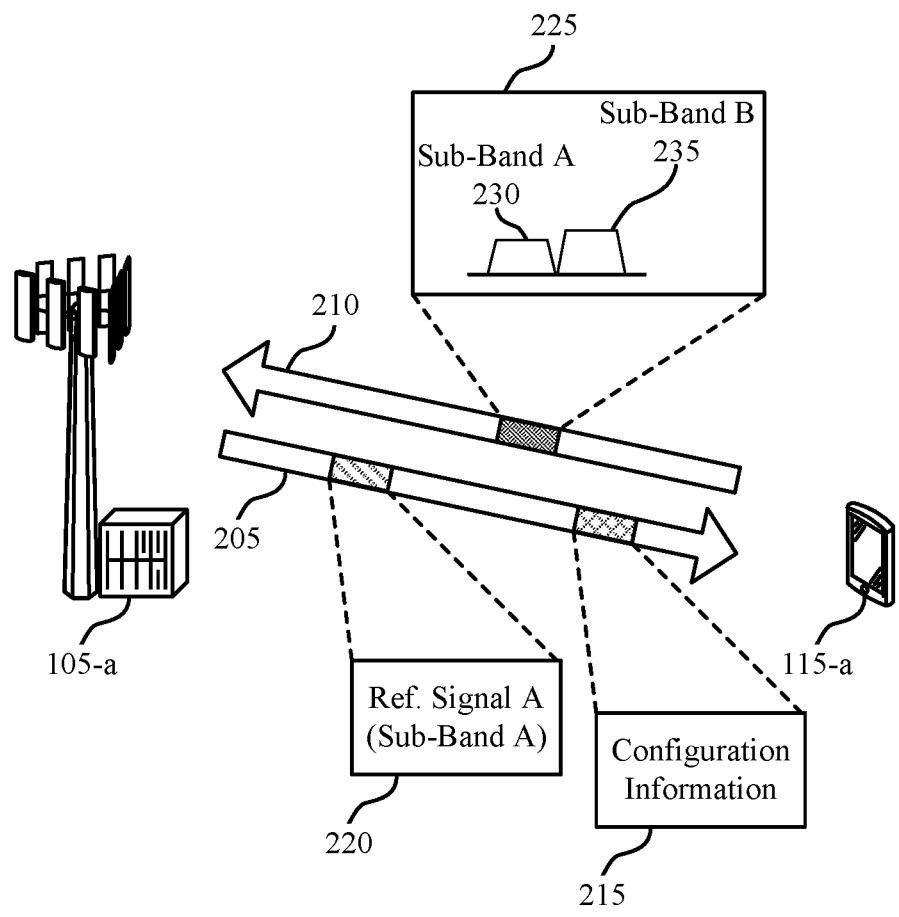
FIG. 2 illustrates an example of a portion of a wireless communications system that supports power control techniques for ultra-wide bandwidth beamforming systems in accordance with aspects of the present disclosure.

FIG. 2 illustrates an example of a wireless communications system 200 that supports power control techniques for ultra-wide bandwidth beamforming systems in accordance with aspects of the present disclosure. The wireless communications system 200 may illustrate communication between a base station 105-a and a UE 115-a, which may be examples of corresponding devices described herein. In some examples, the wireless communications system 200 may support ultra-wide bandwidth communications in which multiple frequency sub-bands may be configured for downlink communications 205 and uplink communications 210.

In some cases, the base station 205-a may configure the UE 115-a, using configuration information 215, for communications using the multiple frequency sub-bands, and may configure the UE 115-a to measure path loss on one or more specified sub-bands. In some cases, uplink power control for other sub-bands used for uplink communications 210 (e.g., PUSCH transmissions, PUCCH transmissions, SRS transmissions, or any combinations thereof) may be determined based on the measurements on the specified sub-bands. In some cases, the base station 105-a may transmit a reference signal 220 on a first frequency sub-band (e.g., sub-band A). The UE 115-a may measure the reference signal 220 and determine a measured path loss for the first frequency sub-band. Based on the measured path loss, the UE 115-a may determine uplink transmission power for an uplink communication 225. In some cases, the UE 115-a may determine a first uplink transmission power for the first frequency sub-band 230 (e.g., frequency sub-band A), and may determine an estimated path loss for a second frequency sub-band 235 (e.g., frequency sub-band B) based on the measured path loss of the first frequency sub-band 230. Based on the estimated path loss of the second frequency sub-band 235, the UE 115-a may determine a transmit power for communications that use the second frequency sub-band.

In some cases, power control for the different frequency sub-bands may be based on a power control loop for PUSCH, in which uplink power may be determined according to the formula:

$$P_{PUSCH}(i) = \min\{P_{CMAX}, 10\log_{10}(M_{PUSCH}(i)) = P_{OPUSCH}(j) = \alpha(j) \cdot PL \cdot \Delta_{TF}(i) + f(i)\} \text{ [in dBm]},$$

where $P_{PUSCH}$ is the uplink transmit power, $P_{CMAX}$ is the maximum UE power, $M_{PUSCH}$ is the number of resource blocks, a is an optimization parameter, PL is the path loss, ATF is the transmission format (e.g., modulation and coding scheme (MCS)), and f(i) is the closed loop power control function. Path loss captures propagation loss and array gain due to beamforming, and may be measured at UE 115-a for the first sub-band by measuring the reference signal 220. Propagation loss is a function of carrier frequency. For example, assuming line of sight (LOS) conditions and a path loss exponent (PLE) of two, a 71 GHz transmission has a propagation loss that may be about 1.9 dB lower than a 57 GHz transmission having the same assumptions. If the PLE is assumed to be three, the difference would be about 2.9 dB. Array gain is also a function of carrier frequency given the fixed inter-antenna element spacing used in the antenna array. In some cases, propagation loss and array gain differences between frequency sub-bands may be determined for the UE 115-a, and such differences may be applied to measurements of one sub-band to obtain an estimated path loss for a different sub-band (e.g., one or more scaling or compensation factors may be programmed at the UE 115-a for propagation loss measurements, array gains, or both, which may be applied to a measurement of one sub-band to obtain a path loss estimate of one or more different sub-bands). The optimization parameter a may be a parameter with a value between 0 and 1, which may be set to a relatively low value for high interference settings and to a relatively high value or 1 to fully compensate path loss. In some cases, the power control parameter for path loss (e.g., the PL parameter in the above equation) may be sub-band specific, and measured for each sub-band. For example, a PL-RS may be configured and indicated in downlink control information (DCI) via an SRS resource indicator (SRI). However, as discussed herein, configuration of separate PL-RSs for each different sub-band in an ultra-wide bandwidth system may result in relatively large overhead which may reduce system efficiency. Various aspects of the present disclosure may allow for PL-RSs in fewer than all sub-bands of an ultra-wide bandwidth system (e.g., a system using high frequency ranges in FR4, which may have at least 7 sub-bands with a 2 GHz channelization in the 57-71 GHz range), that may be used to determine an estimated path loss, which may be used to determine a transmission power, for one or more other sub-bands. Further, in some systems, only up to four PL-RSs may be supported, and techniques as discussed herein may be implemented in such systems without requiring configuration and support of additional PL-RSs.

Figure 3:
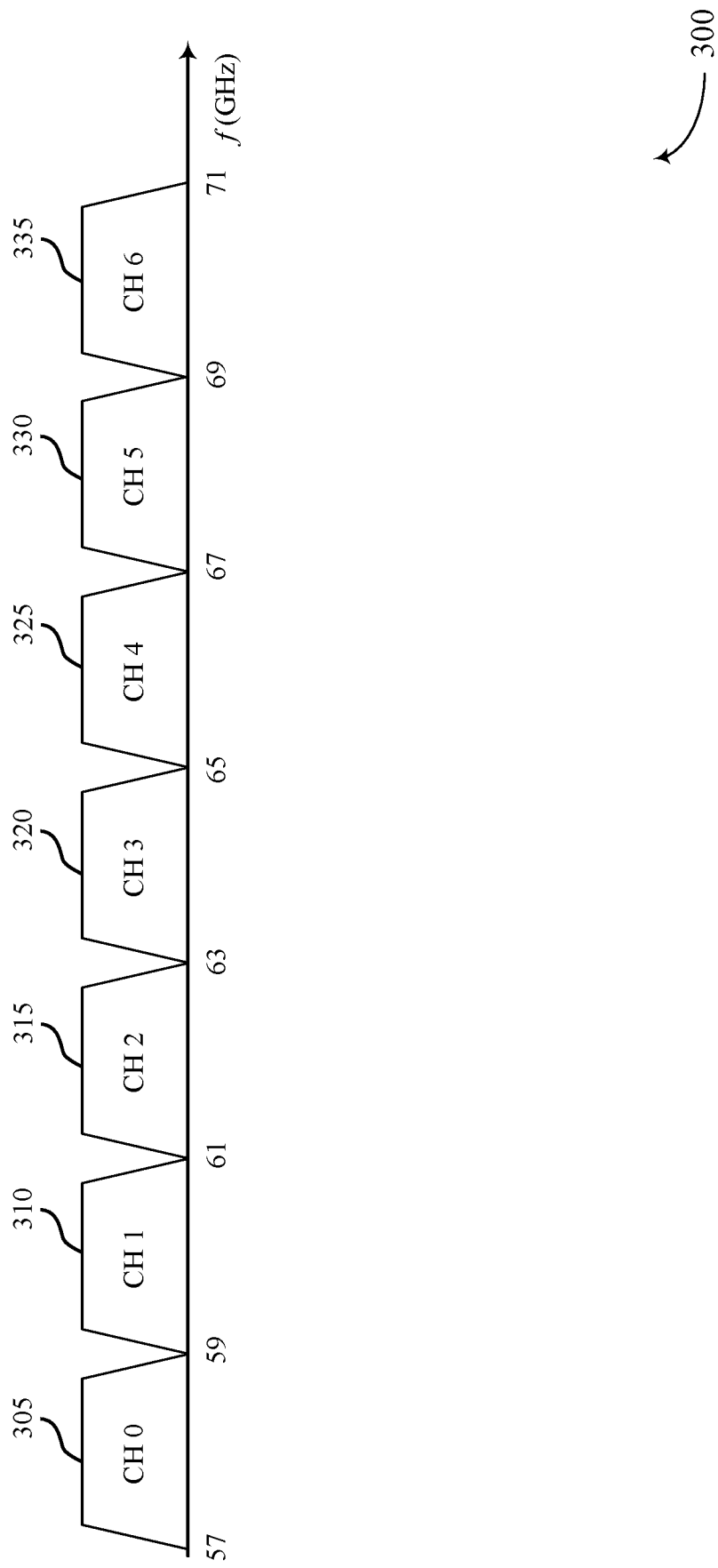
FIG. 3 illustrates an example of a set of frequency sub-bands of an ultra-wide bandwidth that supports power control techniques for ultra-wide bandwidth beamforming systems in accordance with aspects of the present disclosure.

FIG. 3 illustrates an example of a set of frequency sub-bands of an ultra-wide bandwidth 300 that supports power control techniques for ultra-wide bandwidth beamforming systems in accordance with aspects of the present disclosure. In this example, wireless devices (e.g., UE or base station as discussed with reference to FIG. 1 or 2) may use a relatively high frequency range, such as an ultra-wide bandwidth FR4 range from 57 GHz to 71 GHz.

In this example, a 2 GHz channelization for a number of sub-bands may be configured in the 57-71 GHz FR4 band. The 2 GHz channelization in this example may provide a first sub-band 305 for a first channel (channel 0), a second sub-band 310 for a second channel (channel 1), a third sub-band 315 for a third channel (channel 2), a fourth sub-band 320 for a fourth channel (channel 3), a fifth sub-band 325 for a fifth channel (channel 4), a sixth sub-band 330 for a sixth channel (channel 5), and a seventh sub-band 335 for a seventh channel (channel 6). As discussed herein, measurements from one sub-band (e.g., the first sub-band 305) may be used to determine power control parameters for a different sub-band (e.g., the second sub-band 310).

In some cases, a UE may maintain separate path loss compensation parameters (e.g., $\alpha(j)$) for each different sub-band. Further, separate closed-loop power control processes may be maintained for each different sub-band, and TPC commands may be accumulated separately for each sub-band based on TPCs for scheduled sub-bands and one or more other sub-bands that are associated with the scheduled sub-bands. Additionally or alternatively, a PHR may be reported based on a PUSCH power for a sub-band that is determined based on an uplink power and parameters of a different sub-band.

Figure 4:
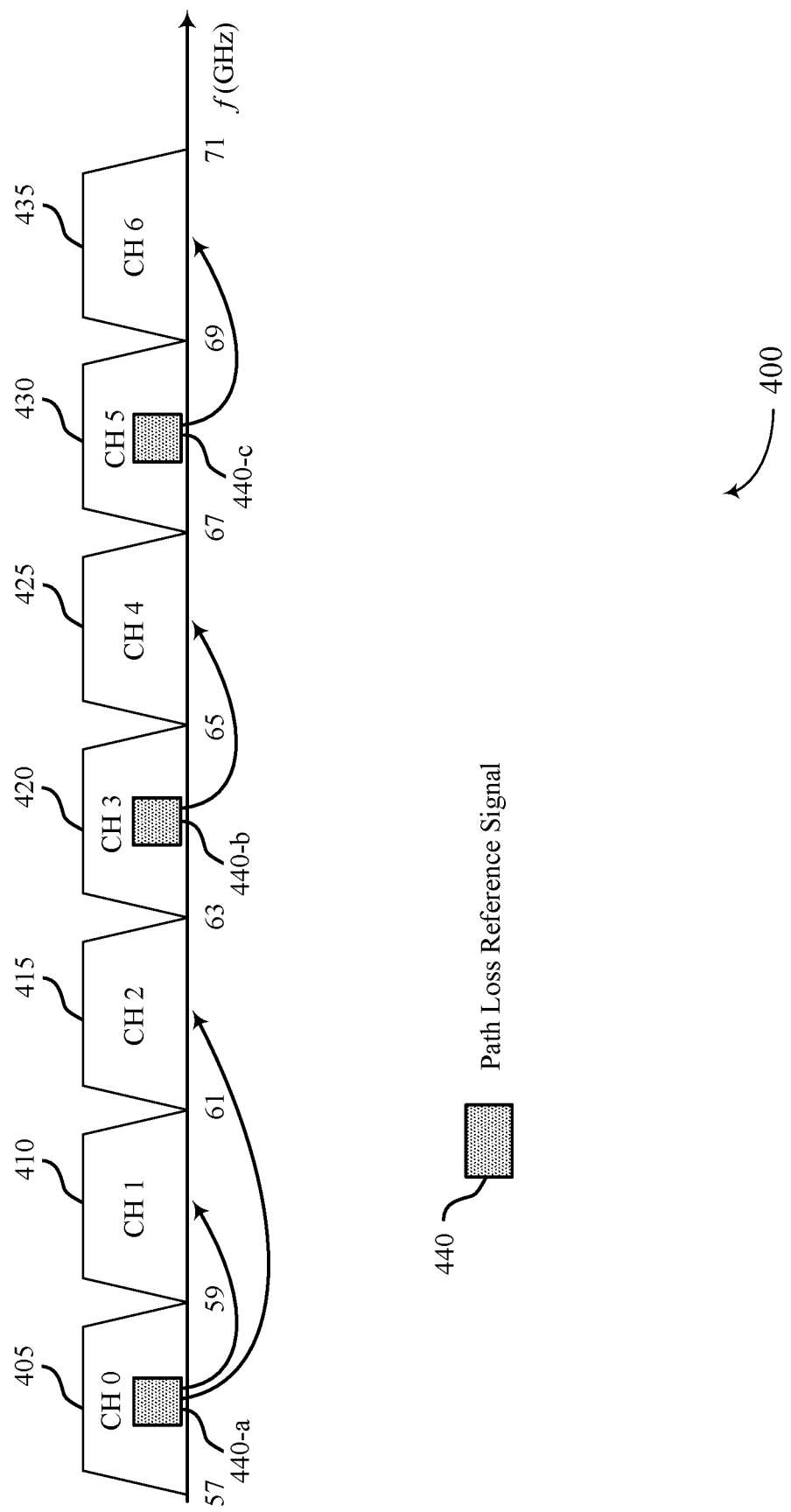
FIG. 4 illustrates an example of a set of frequency sub-bands of an ultra-wide bandwidth that supports power control techniques for ultra-wide bandwidth beamforming systems in accordance with aspects of the present disclosure.

FIG. 4 illustrates an example of a set of frequency sub-bands of an ultra-wide bandwidth 400 and associated sub-bands that support power control techniques for ultra-wide bandwidth beamforming systems in accordance with aspects of the present disclosure. In this example, similarly as discussed with reference to FIG. 3, wireless devices (e.g., UE or base station as discussed with reference to FIG. 1 or 2) may use a relatively high frequency range, such as an ultra-wide bandwidth FR4 range from 57 GHz to 71 GHz.

In this example, a 2 GHz channelization for a number of sub-bands may be configured in the 57-71 GHz FR4 band. The 2 GHz channelization in this example may provide a first sub-band 405 for a first channel (channel 0), a second sub-band 410 for a second channel (channel 1), a third sub-band 415 for a third channel (channel 2), a fourth sub-band 420 for a fourth channel (channel 3), a fifth sub-band 425 for a fifth channel (channel 4), a sixth sub-band 430 for a sixth channel (channel 5), and a seventh sub-band 435 for a seventh channel (channel 6). In this example, a first path loss reference signal 440-a may be transmitted in the first sub-band 405, and may be used to estimate a path loss and determine power control parameters for the second sub-band 410 and the third sub-band 415. A second path loss reference signal 440-b may be transmitted in the fourth sub-band 420 and may be used to estimate a path loss and determine power control parameters for the fifth sub-band 425. A third path loss reference signal 440-c may be transmitted in the sixth sub-band 430 and may be used to estimate a path loss and determine power control parameters for the seventh sub-band 435.

In some cases, the UE may be configured (e.g., via RRC signaling, DCI or a MAC-CE) to measure path loss only on the first sub-band 405, the fourth sub-band 420, and the sixth sub-band 430, which may be related to other sub-bands on which uplink communications may be transmitted (e.g., to one or more the sub-bands on which PUSCH/PUCCH/SRS are scheduled). For example, using the path loss measurements from the first sub-band 305, the UE may estimate path loss on the second sub-band 410 and the third sub-band 415, in which uplink data may be scheduled. In some cases, the UE may maintain separate optimization parameters for different sub-bands, and thus values of $\alpha(j)$ may be sub-band specific.

In some cases, a closed-loop power control parameter (e.g., $f(i)$) also may be sub-band specific. In such cases, a serving base station may provide an indication that the closed-loop power control parameter is to be incremented or decremented in accordance with established techniques (e.g., using transmitter power control (TPC) commands as defined by LTE or NR specifications), and the accumulated value may be used as the closed-loop power control parameter, which may be separate for each sub-band. In other cases, instead of the base station configuring separate closed-loop power control for each sub-band, the UE may maintain separate loops for each sub-band and accumulate the received TPC into the relevant loop (e.g., depending on the sub-band in which PUSCH is scheduled). In some cases, the base station may configure the UE with two power control loops, that may each be mapped to one or more additional sub-bands. For example, standalone TPC may be configured and the UE may receive a 'standalone TPC' (e.g., via DCI format 2_x), and the mapping may be used to indicate the power control loop(s) at the UE to which the TPC command is to be applied. For example, TPC commands may be applied to all loops, or a set of configured default loops, or a default loop(s) that depends on the sub-band in which the DCI itself was received.

Additionally or alternatively, the UE may report PHR for one or more sub-bands based on measurements from one or more different sub-bands. PHR for PUSCH may be determined based on, for example, $PHR = P_{CMAX} - P_{PUSCH}$. In some cases, PHR calculation happens before the cap of $P_{CMAX}$ is applied, so in practice, PHR can be positive or negative. If PHR is positive the UE still has more power to transmit, and if PHR is negative the UE would like to transmit at a power larger than is available (PHR may be computed knowing $P_{PUSCH}$). This power could represent the transmit power of an actual PUSCH, or of some virtual PUSCH (with configured default parameters such as no. of RBs, PL-RS, etc.). While PHR may be reported on multiple sub-bands, overhead can increase as more sub-bands are reported. In accordance with some aspects of the present disclosure, a UE may report PHR for fewer than all of the sub-bands. In some cases, when the actual or true PUSCH is only scheduled on a subset of the sub-bands, $P_{PUSCH}$ may be determined with what may be referred to as a "semi-virtual" PUSCH. That is, $P_{PUSCH}$ may be calculated for the non-scheduled sub-bands using a mix of configured default parameters and parameters from the actual or true PUSCH. For example, $P_{PUSCH}$ can represent the value that would have resulted if the actual granted PUSCH had been modified by moving the allocated RBs to one or more other sub-bands.

Figure 5:
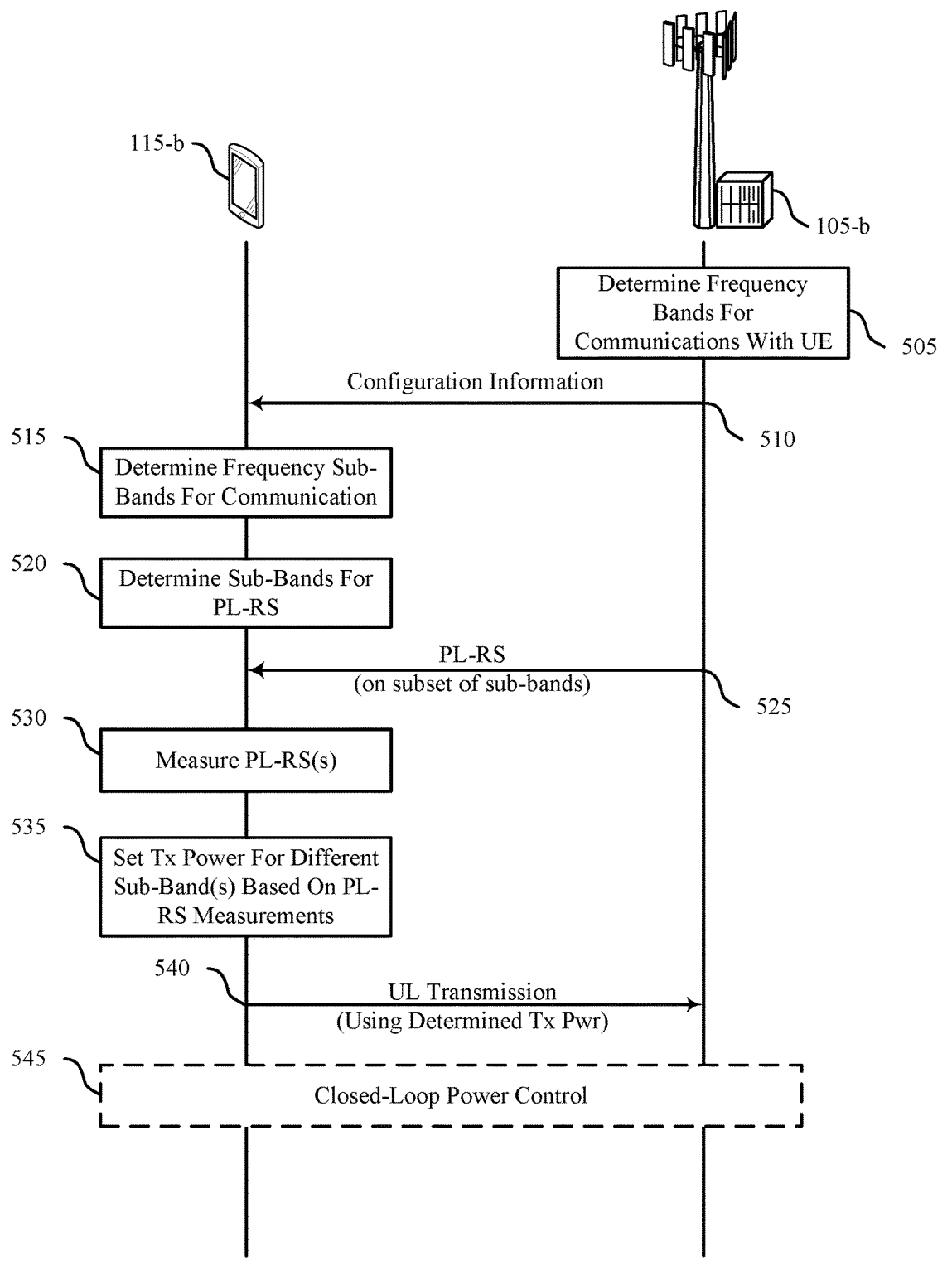
FIG. 5 illustrates an example of a process flow that supports power control techniques for ultra-wide bandwidth beamforming systems in accordance with aspects of the present disclosure.

FIG. 5 illustrates an example of a process flow 500 that supports power control techniques for ultra-wide bandwidth beamforming systems in accordance with aspects of the present disclosure. In some examples, process flow 500 may implement aspects of wireless communications system 100 or 200 of FIGS. 1-2 and ultra-wide band power control techniques such as discussed with reference to one or more of FIGS. 2-4. The process flow 500 may illustrate communication between a base station 105-*b* and a UE 115-*b*, which may be examples of such devices described herein. Alternative examples of the process flow may be implemented, in which some features are performed in a different order than described or are not performed at all. In some examples, operations may include additional features not mentioned below, or further operations may be added.

At 505, the base station 105-*b* may determine frequency bands for communications with the UE 115-*b*. In some cases, the base station 105-*b* may determine that a relatively high frequency band is to be used for ultra-wide bandwidth communications, such as FR4, and that a number of sub-bands are to be used for communications (e.g., 7 sub-bands that are each 2 GHz). At 510, the base station 105-*b* may transmit configuration information to the UE 115-*b* to that indicates that the number of sub-bands are to be used for ultra-wide bandwidth communications in FR4. In some cases, the configuration information may include information related to PL-RSs that are configured in one or more of the sub-bands, and that may also indicate that one or more other sub-bands that are not configured with a PL-RS may be associated with one or more of the configured PL-RSs.

At 515, the UE 115-*b* may determine the frequency sub-bands for communications. In some cases, the UE 115-*b* may provide the base station 105-*b* with capability information that indicates the UE 115-*b* is capable of ultra-wide bandwidth communications using FR4, and the configuration information may be provided responsive to the UE 115-*b* capability. In some cases, the UE 115-*b* and base station 105-*b* may perform one or more beam training procedures to identify one or more beams that are to be used for beamformed communications that use the frequency sub-bands.

At 520, the UE 115-*b* may determine one or more sub-bands for PL-RS. In some cases, the configuration information from the base station 105-*b* may indicate the sub-bands that include PL-RSs. In other cases, one or more sub-bands may be default sub-bands that include a PL-RS, and the UE 115-*b* may determine the one or more sub-bands based on the default sub-bands. In still other cases, the base station 105-*b* may transmit an index value that is mapped to a set of frequency sub-bands, a subset of which are configured with a PL-RS. At 525, the base station 105-*b* may transmit one or more PL-RS transmissions using one or more of the sub-bands that are configured for PL-RS.

At 530, the UE 115-*b* may measure one or more PL-RSs and use the measurements to identify a path loss for the associated sub-band. In some cases, the UE 115-*b* may use the measured path loss to determine an uplink transmission power associated with the particular sub-band that included the PL-RS. In some cases, the UE 115-*b* may determine an estimated path loss for one or more other sub-bands based on the measured PL-RS of a different sub-band. At 535, the UE 115-*b* may set the transmission power for one or more sub-bands based on the PL-RS measurements of a different sub-band. At 540, the UE 115-*b* may transmit one or more uplink transmissions using the determined transmit power on one or more frequency sub-bands.

Optionally, at 545, the UE 115-*b* and base station 105-*b* may perform closed-loop power control functions for the configured sub-bands. In some cases, as discussed herein, the base station 105-*b* may transmit one or more TPC commands for a first sub-band that may be used at the UE 115-*b* to update one or more power control loops for the first sub-band and one or more other sub-bands that are associated with the first sub-band.

Figure 6:
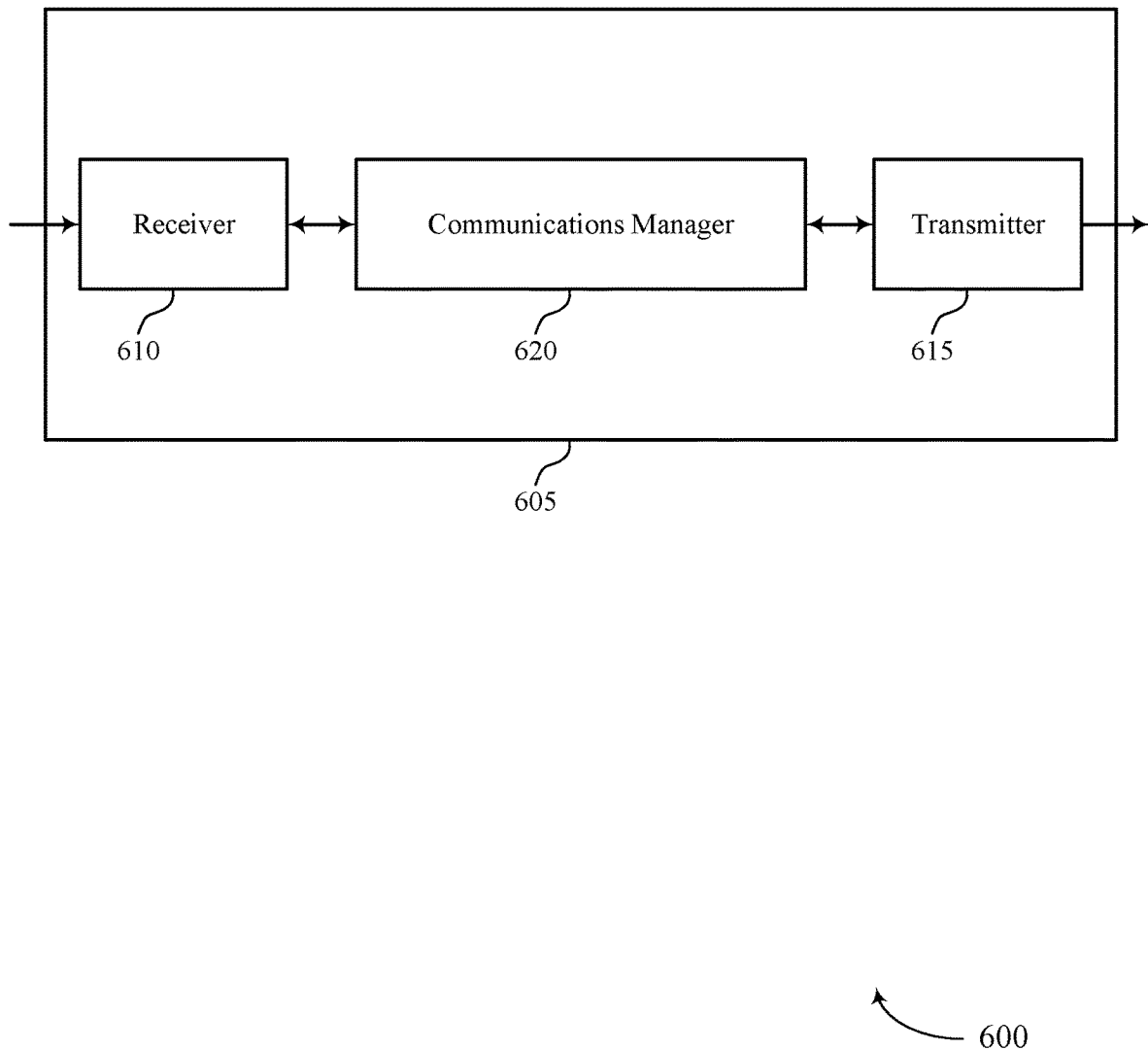
FIGS. 6 and 7 show block diagrams of devices that support power control techniques for ultra-wide bandwidth beamforming systems in accordance with aspects of the present disclosure.

FIG. 6 shows a block diagram 600 of a device 605 that supports power control techniques for ultra-wide bandwidth beamforming systems in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power control techniques for ultra-wide bandwidth beamforming systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power control techniques for ultra-wide bandwidth beamforming systems). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of power control techniques for ultra-wide bandwidth beamforming systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for identifying a set of multiple frequency sub-bands for communications with a base station and a first frequency sub-band of the set of multiple frequency sub-bands as a measurement sub-band. The communications manager 620 may be configured as or otherwise support a means for measuring, responsive to the identifying, at least a first reference signal on the first frequency sub-band. The communications manager 620 may be configured as or otherwise support a means for setting a first transmission power for the first frequency sub-band and a second transmission power for a second frequency sub-band of the set of multiple frequency sub-bands based on the measuring the first reference signal on the first frequency sub-band. The communications manager 620 may be configured as or otherwise support a means for transmitting, at the second transmission power, one or more uplink communications to the base station on the second frequency sub-band.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for determination of power control parameters for multiple sub-bands based on a reference signal transmitted in one of the sub-bands, thus reducing overhead relative to transmission of separate reference signals in each sub-band and increasing the amount of information transferred relative to a system that does not use such techniques. Further, based on transmission power determination based on measurements of the first sub-band, more reliable measurements may be obtained with a reduced likelihood of CIR or beam squinting errors, which may provide increased reliability and a greater likelihood of successful communication.

Figure 7:
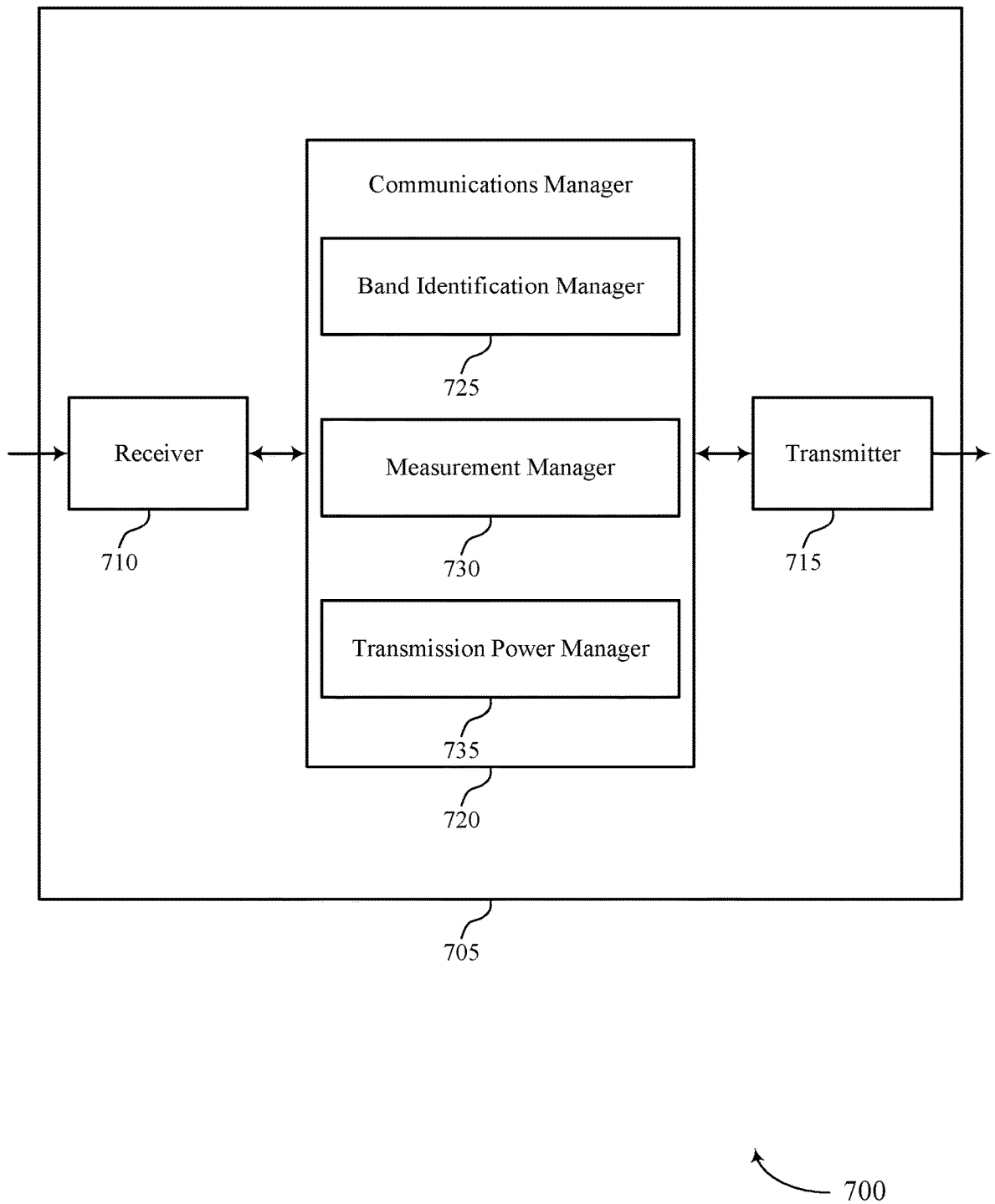

FIG. 7 shows a block diagram 700 of a device 705 that supports power control techniques for ultra-wide bandwidth beamforming systems in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power control techniques for ultra-wide bandwidth beamforming systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power control techniques for ultra-wide bandwidth beamforming systems). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of power control techniques for ultra-wide bandwidth beamforming systems as described herein. For example, the communications manager 720 may include a band identification manager 725, a measurement manager 730, a transmission power manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The band identification manager 725 may be configured as or otherwise support a means for identifying a set of multiple frequency sub-bands for communications with a base station and a first frequency sub-band of the set of multiple frequency sub-bands as a measurement sub-band. The measurement manager 730 may be configured as or otherwise support a means for measuring, responsive to the identifying, at least a first reference signal on the first frequency sub-band. The transmission power manager 735 may be configured as or otherwise support a means for setting a first transmission power for the first frequency sub-band and a second transmission power for a second frequency sub-band of the set of multiple frequency sub-bands based on the measuring the first reference signal on the first frequency sub-band. The transmission power manager 735 may be configured as or otherwise support a means for transmitting, at the second transmission power, one or more uplink communications to the base station on the second frequency sub-band.

Figure 8:
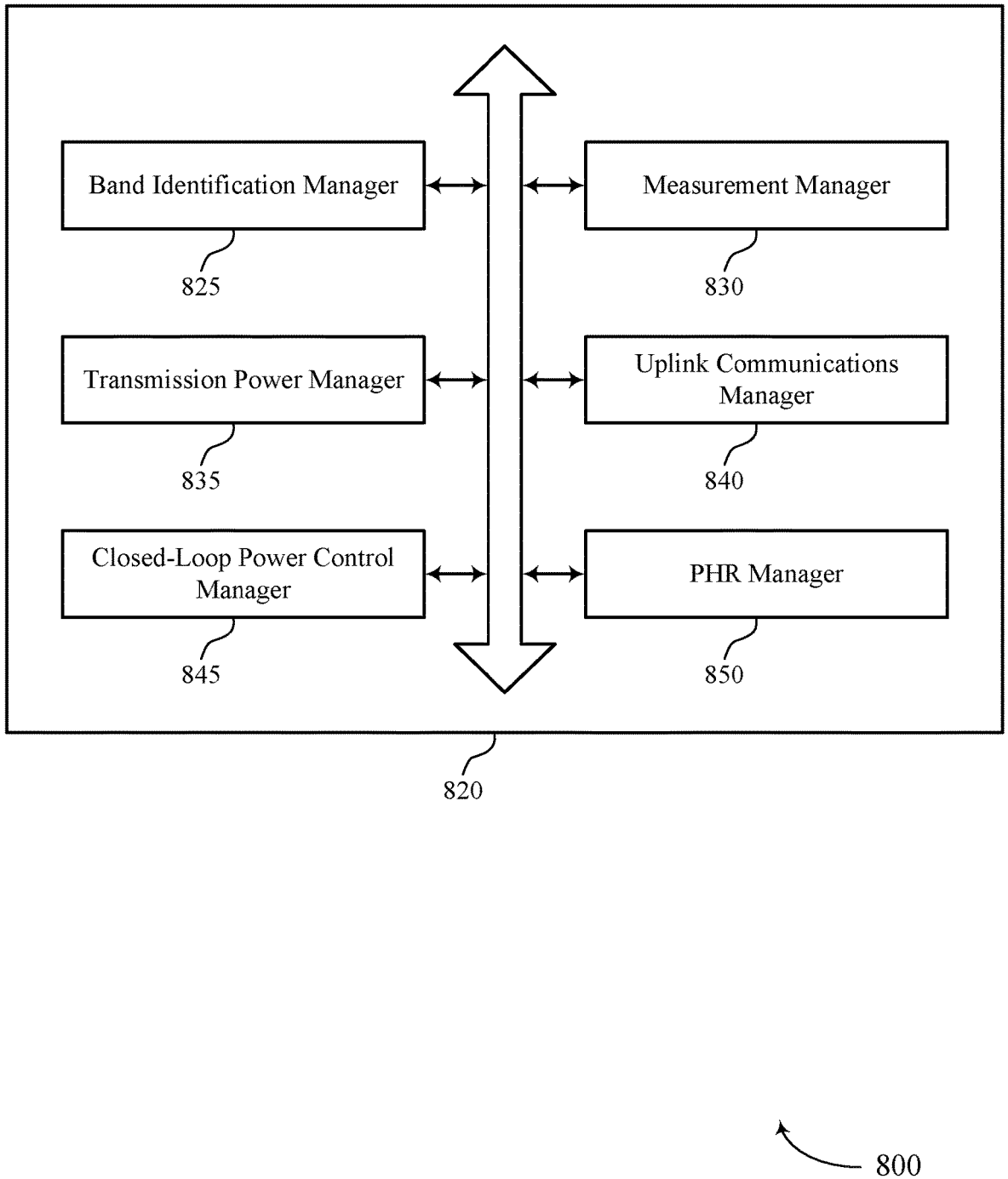
FIG. 8 shows a block diagram of a communications manager that supports power control techniques for ultra-wide bandwidth beamforming systems in accordance with aspects of the present disclosure.

FIG. 8 shows a block diagram 800 of a communications manager 820 that supports power control techniques for ultra-wide bandwidth beamforming systems in accordance with aspects of the present disclosure. The communications manager 820 may be an example of aspects of a communications manager 620, a communications manager 720, or both, as described herein. The communications manager 820, or various components thereof, may be an example of means for performing various aspects of power control techniques for ultra-wide bandwidth beamforming systems as described herein. For example, the communications manager 820 may include a band identification manager 825, a measurement manager 830, a transmission power manager 835, an uplink communications manager 840, a closed-loop power control manager 845, an PHR manager 850, or any combination thereof. Each of these components may communicate, directly or indirectly, with one another (e.g., via one or more buses).

The communications manager 820 may support wireless communication at a UE in accordance with examples as disclosed herein. The band identification manager 825 may be configured as or otherwise support a means for identifying a set of multiple frequency sub-bands for communications with a base station and a first frequency sub-band of the set of multiple frequency sub-bands as a measurement sub-band. The measurement manager 830 may be configured as or otherwise support a means for measuring, responsive to the identifying, at least a first reference signal on the first frequency sub-band. The transmission power manager 835 may be configured as or otherwise support a means for setting a first transmission power for the first frequency sub-band and a second transmission power for a second frequency sub-band of the set of multiple frequency sub-bands based on the measuring the first reference signal on the first frequency sub-band. In some examples, the transmission power manager 835 may be configured as or otherwise support a means for transmitting, at the second transmission power, one or more uplink communications to the base station on the second frequency sub-band.

In some examples, the measurement manager 830 may be configured as or otherwise support a means for determining a first path loss of the first frequency sub-band based on the measuring the first reference signal. In some examples, the measurement manager 830 may be configured as or otherwise support a means for determining an estimated path loss for at least the second frequency sub-band based on the first path loss of the first frequency sub-band.

In some examples, the one or more uplink communications include one or more of an uplink shared channel communication, an uplink control channel communication, a sounding reference signal communication, or any combinations thereof, that are scheduled on the second frequency sub-band. In some examples, the first frequency sub-band is in a first subset of the set of multiple frequency sub-bands that are measurement sub-bands, and the second frequency sub-band is in a second subset of the set of multiple frequency sub-bands that is non-overlapping with the first subset of frequency sub-bands. In some examples, where measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands.

In some examples, the measurement manager 830 may be configured as or otherwise support a means for determining a first path loss compensation parameter for the first frequency sub-band and a second path loss compensation parameter for the second frequency sub-band based on one or more measurements of the first reference signal.

In some examples, the closed-loop power control manager 845 may be configured as or otherwise support a means for initiating a set of multiple closed-loop power control processes that are each associated with a respective frequency sub-band of the set of multiple frequency sub-bands, and where a transmit power of each of the set of multiple frequency sub-bands is set based on the corresponding closed-loop power control process.

In some examples, the UE accumulates received transmit power control (TPC) commands into the closed-loop power control process associated with the frequency sub-band in which an uplink communication is scheduled. In some examples, the received TPC commands include an indication of one or more of the set of multiple closed-loop power control processes to which the TPC command is to be applied. In some examples, the indication in the TPC commands indicates, based on the frequency sub-band in which the TPC command is received, that an associated TPC is to be applied to each of the set of multiple closed-loop power control processes, to a subset of the set of multiple closed-loop power control processes, or to one or more default closed-loop power control processes.

In some examples, the transmission power manager 835 may be configured as or otherwise support a means for determining a second uplink shared channel power for the second frequency sub-band based on a first uplink shared channel power for an uplink communication in the first frequency sub-band. In some examples, the PHR manager 850 may be configured as or otherwise support a means for reporting a power headroom to the base station for the second frequency sub-band based on the determined second uplink shared channel power.

In some examples, the second uplink shared channel power is determined based on a set of configured default parameters and the first uplink shared channel power for the uplink communication in the first frequency sub-band. In some examples, the second uplink shared channel power is determined based on a resource allocation of the uplink communication in the first frequency sub-band being applied to the second frequency sub-band.

Figure 9:
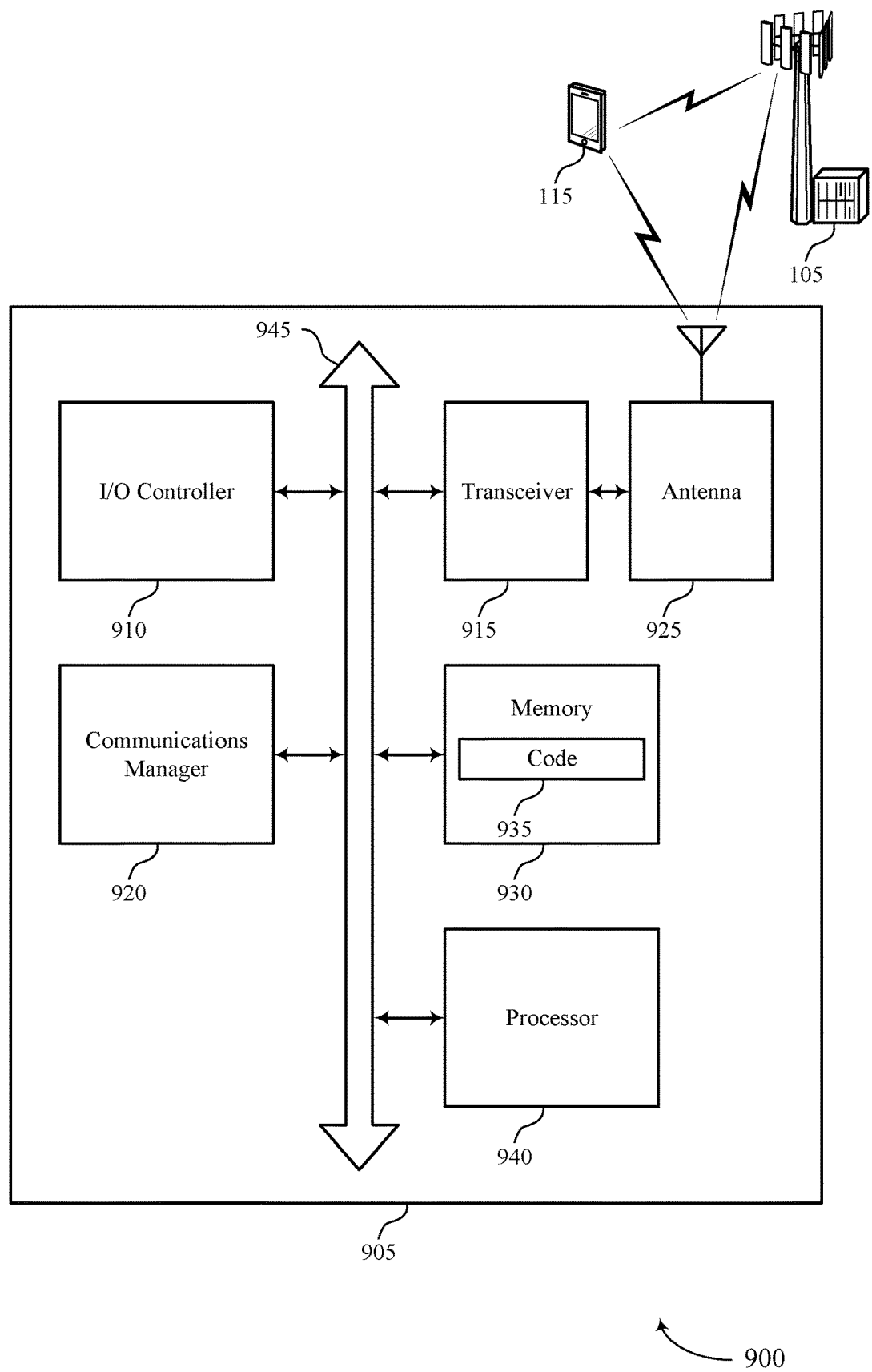
FIG. 9 shows a diagram of a system including a device that supports power control techniques for ultra-wide bandwidth beamforming systems in accordance with aspects of the present disclosure.

FIG. 9 shows a diagram of a system 900 including a device 905 that supports power control techniques for ultra-wide bandwidth beamforming systems in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting power control techniques for ultra-wide bandwidth beamforming systems). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying a set of multiple frequency sub-bands for communications with a base station and a first frequency sub-band of the set of multiple frequency sub-bands as a measurement sub-band. The communications manager 920 may be configured as or otherwise support a means for measuring, responsive to the identifying, at least a first reference signal on the first frequency sub-band. The communications manager 920 may be configured as or otherwise support a means for setting a first transmission power for the first frequency sub-band and a second transmission power for a second frequency sub-band of the set of multiple frequency sub-bands based on the measuring the first reference signal on the first frequency sub-band. The communications manager 920 may be configured as or otherwise support a means for transmitting, at the second transmission power, one or more uplink communications to the base station on the second frequency sub-band.

By including or configuring the communications manager 920 in accordance with examples as described herein, the device 905 may support techniques for determination of power control parameters for multiple sub-bands based on a reference signal transmitted in one of the sub-bands, thus reducing overhead relative to transmission of separate reference signals in each sub-band and increasing the amount of information transferred relative to a system that does not use such techniques. Further, based on transmission power determination based on measurements of the first sub-band, more reliable measurements may be obtained with a reduced likelihood of CIR or beam squinting errors, which may provide increased reliability and a greater likelihood of successful communication.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of power control techniques for ultra-wide bandwidth beamforming systems as described herein, or the processor 940 and the memory 930 may be otherwise configured to perform or support such operations.

Figure 10:
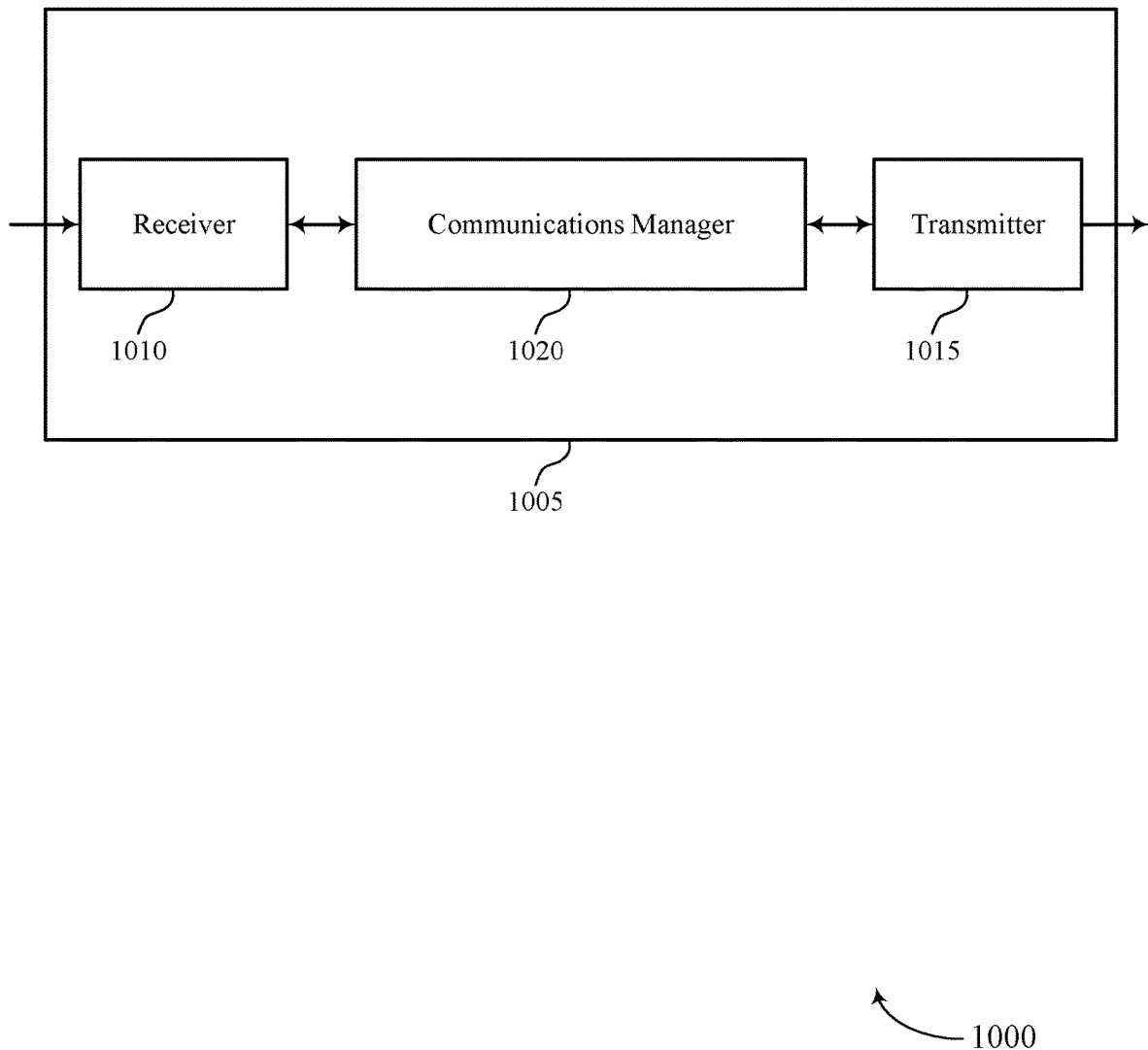
FIGS. 10 and 11 show block diagrams of devices that support power control techniques for ultra-wide bandwidth beamforming systems in accordance with aspects of the present disclosure.

FIG. 10 shows a block diagram 1000 of a device 1005 that supports power control techniques for ultra-wide bandwidth beamforming systems in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power control techniques for ultra-wide bandwidth beamforming systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power control techniques for ultra-wide bandwidth beamforming systems). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of power control techniques for ultra-wide bandwidth beamforming systems as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands. The communications manager 1020 may be configured as or otherwise support a means for transmitting a first reference signal on a first frequency sub-band of the first subset of frequency sub-bands. The communications manager 1020 may be configured as or otherwise support a means for receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for determination of power control parameters for multiple sub-bands based on a reference signal transmitted in one of the sub-bands, thus reducing overhead relative to transmission of separate reference signals in each sub-band and increasing the amount of information transferred relative to a system that does not use such techniques. Further, based on transmission power determination based on measurements of the first sub-band, more reliable measurements may be obtained with a reduced likelihood of CIR or beam squinting errors, which may provide increased reliability and a greater likelihood of successful communication.

Figure 11:
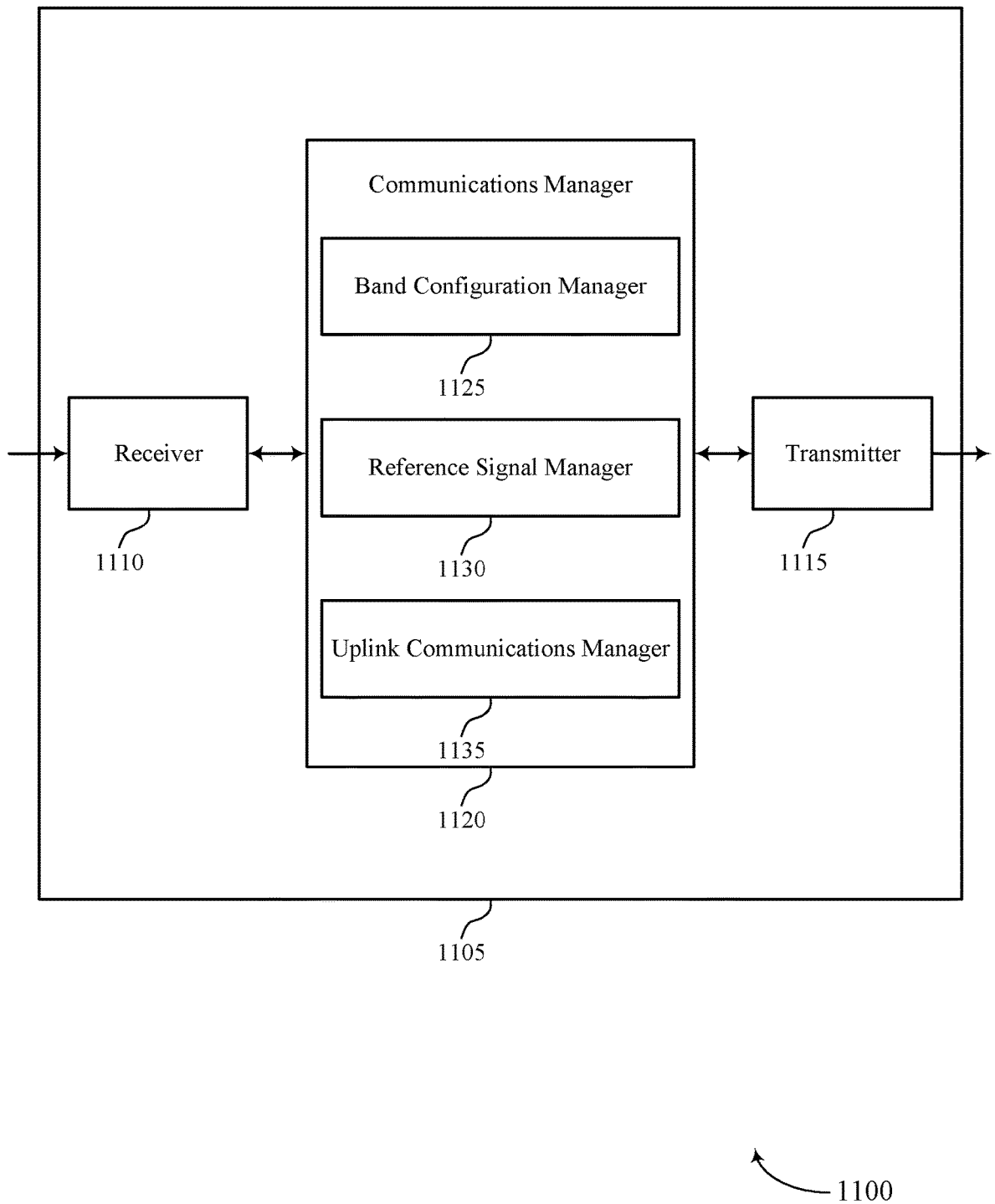

FIG. 11 shows a block diagram 1100 of a device 1105 that supports power control techniques for ultra-wide bandwidth beamforming systems in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power control techniques for ultra-wide bandwidth beamforming systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power control techniques for ultra-wide bandwidth beamforming systems). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of power control techniques for ultra-wide bandwidth beamforming systems as described herein. For example, the communications manager 1120 may include a band configuration manager 1125, a reference signal manager 1130, an uplink communications manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The band configuration manager 1125 may be configured as or otherwise support a means for transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands. The reference signal manager 1130 may be configured as or otherwise support a means for transmitting a first reference signal on a first frequency sub-band of the first subset of frequency sub-bands. The uplink communications manager 1135 may be configured as or otherwise support a means for receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

Figure 12:
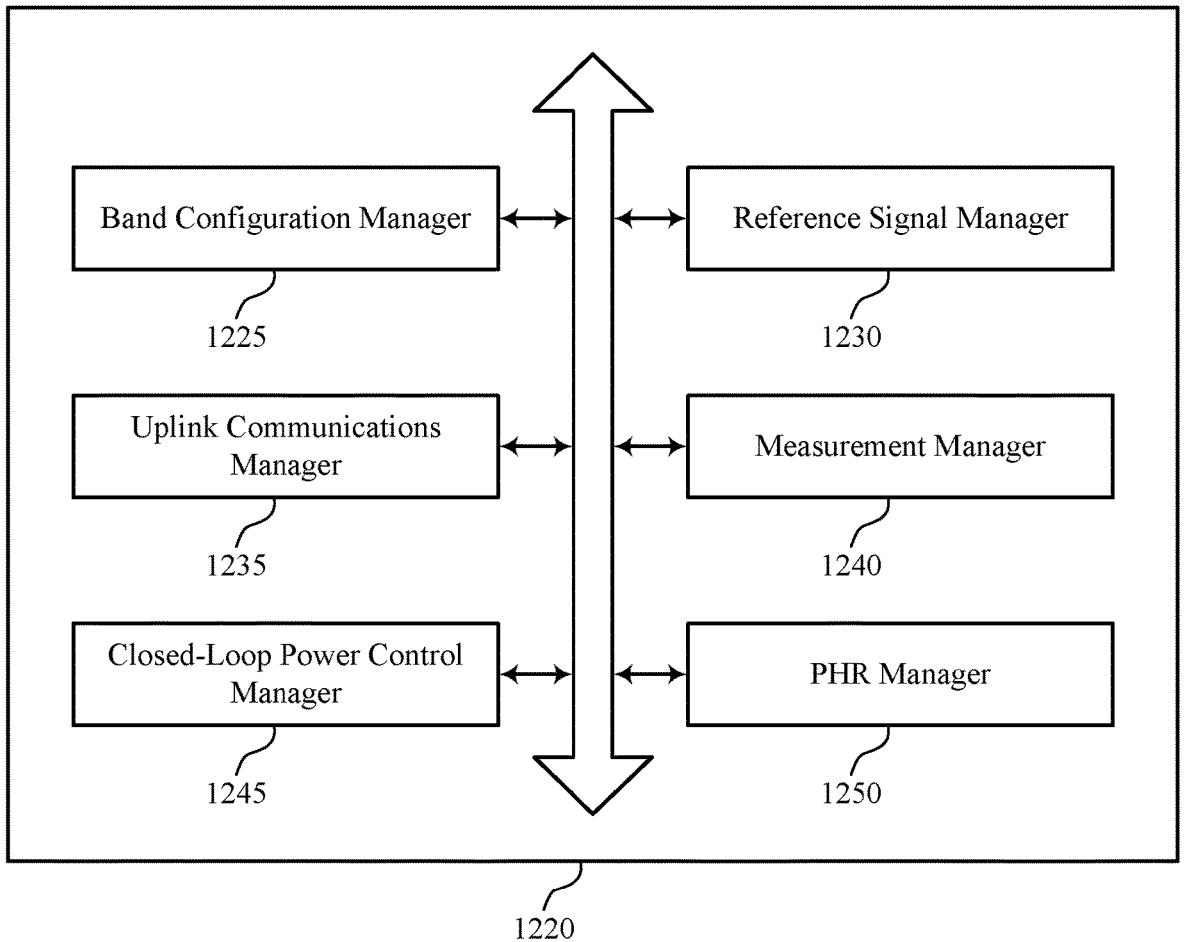
FIG. 12 shows a block diagram of a communications manager that supports power control techniques for ultra-wide bandwidth beamforming systems in accordance with aspects of the present disclosure.

FIG. 12 shows a block diagram 1200 of a communications manager 1220 that supports power control techniques for ultra-wide bandwidth beamforming systems in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of power control techniques for ultra-wide bandwidth beamforming systems as described herein. For example, the communications manager 1220 may include a band configuration manager 1225, a reference signal manager 1230, an uplink communications manager 1235, a measurement manager 1240, a closed-loop power control manager 1245, an PHR manager 1250, or any combination thereof. Each of these components may communicate, directly or indirectly, with one another (e.g., via one or more buses).

The communications manager 1220 may support wireless communication at a base station in accordance with examples as disclosed herein. The band configuration manager 1225 may be configured as or otherwise support a means for transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands. The reference signal manager 1230 may be configured as or otherwise support a means for transmitting a first reference signal on a first frequency sub-band of the first subset of frequency sub-bands. The uplink communications manager 1235 may be configured as or otherwise support a means for receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

In some examples, the configuration information further indicates that a first path loss of the first frequency sub-band is to be used to estimate a second path loss for at least the second frequency sub-band. In some examples, the one or more uplink communications include one or more of an uplink shared channel communication, an uplink control channel communication, a sounding reference signal communication, or any combinations thereof, that are scheduled on the second frequency sub-band. In some examples, the configuration information indicates that measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands. In some examples, the configuration information indicates that a first path loss compensation parameter for the first frequency sub-band and a second path loss compensation parameter for the second frequency sub-band are to be based on one or more measurements of the first reference signal.

In some examples, the configuration information further provides for initiation of a set of multiple closed-loop power control processes at the UE that are each associated with a respective frequency sub-band of the set of multiple frequency sub-bands, and where a transmit power of each of the set of multiple frequency sub-bands is set based on the corresponding closed-loop power control process. In some examples, the configuration information further provides that the UE accumulates received transmit power control (TPC) commands into the closed-loop power control process associated with the frequency sub-band in which an uplink communication is scheduled. In some examples, the TPC commands include an indication of one or more of the set of multiple closed-loop power control processes to which the TPC command is to be applied. In some examples, the indication in the TPC commands indicates, based on the frequency sub-band in which the TPC command is received, that an associated TPC is to be applied to each of the set of multiple closed-loop power control processes, to a subset of the set of multiple closed-loop power control processes, or to one or more default closed-loop power control processes.

In some examples, the PHR manager 1250 may be configured as or otherwise support a means for receiving, from the UE, a power headroom report for the second frequency sub-band that is based on a first uplink shared channel power for an uplink communication in the first frequency sub-band.

In some examples, the configuration information further includes a set of configured default parameters for determining a second uplink shared channel power based on the first uplink shared channel power for the first frequency sub-band. In some examples, the second uplink shared channel power is determined based on a resource allocation of an uplink communication in the first frequency sub-band being applied to the second frequency sub-band.

Figure 13:
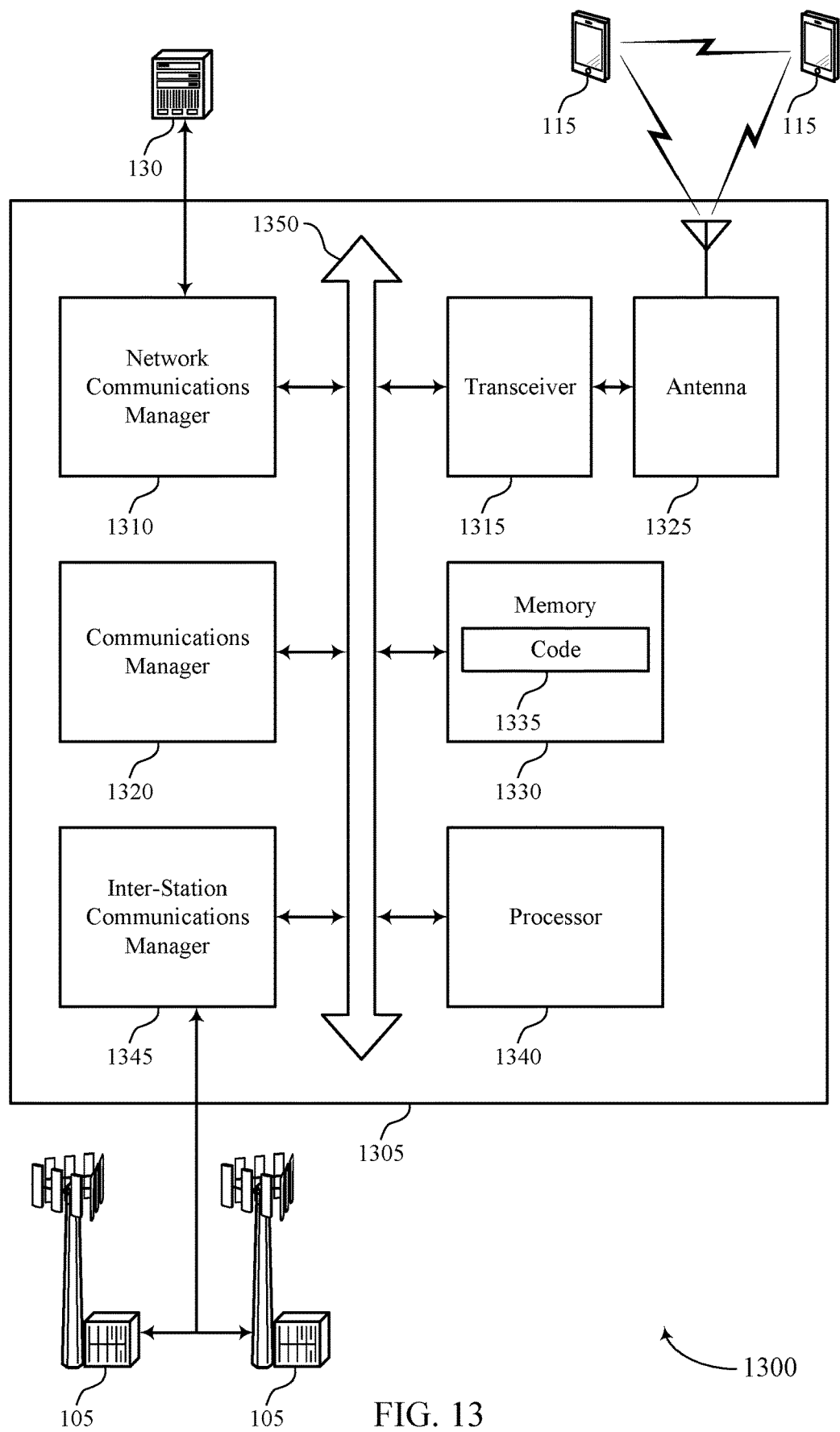
FIG. 13 shows a diagram of a system including a device that supports power control techniques for ultra-wide bandwidth beamforming systems in accordance with aspects of the present disclosure.

FIG. 13 shows a diagram of a system 1300 including a device 1305 that supports power control techniques for ultra-wide bandwidth beamforming systems in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting power control techniques for ultra-wide bandwidth beamforming systems). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands. The communications manager 1320 may be configured as or otherwise support a means for transmitting a first reference signal on a first frequency sub-band of the first subset of frequency sub-bands. The communications manager 1320 may be configured as or otherwise support a means for receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band.

By including or configuring the communications manager 1320 in accordance with examples as described herein, the device 1305 may support techniques for determination of power control parameters for multiple sub-bands based on a reference signal transmitted in one of the sub-bands, thus reducing overhead relative to transmission of separate reference signals in each sub-band and increasing the amount of information transferred relative to a system that does not use such techniques. Further, based on transmission power determination based on measurements of the first sub-band, more reliable measurements may be obtained with a reduced likelihood of CIR or beam squinting errors, which may provide increased reliability and a greater likelihood of successful communication.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of power control techniques for ultra-wide bandwidth beamforming systems as described herein, or the processor 1340 and the memory 1330 may be otherwise configured to perform or support such operations.

Figure 14:
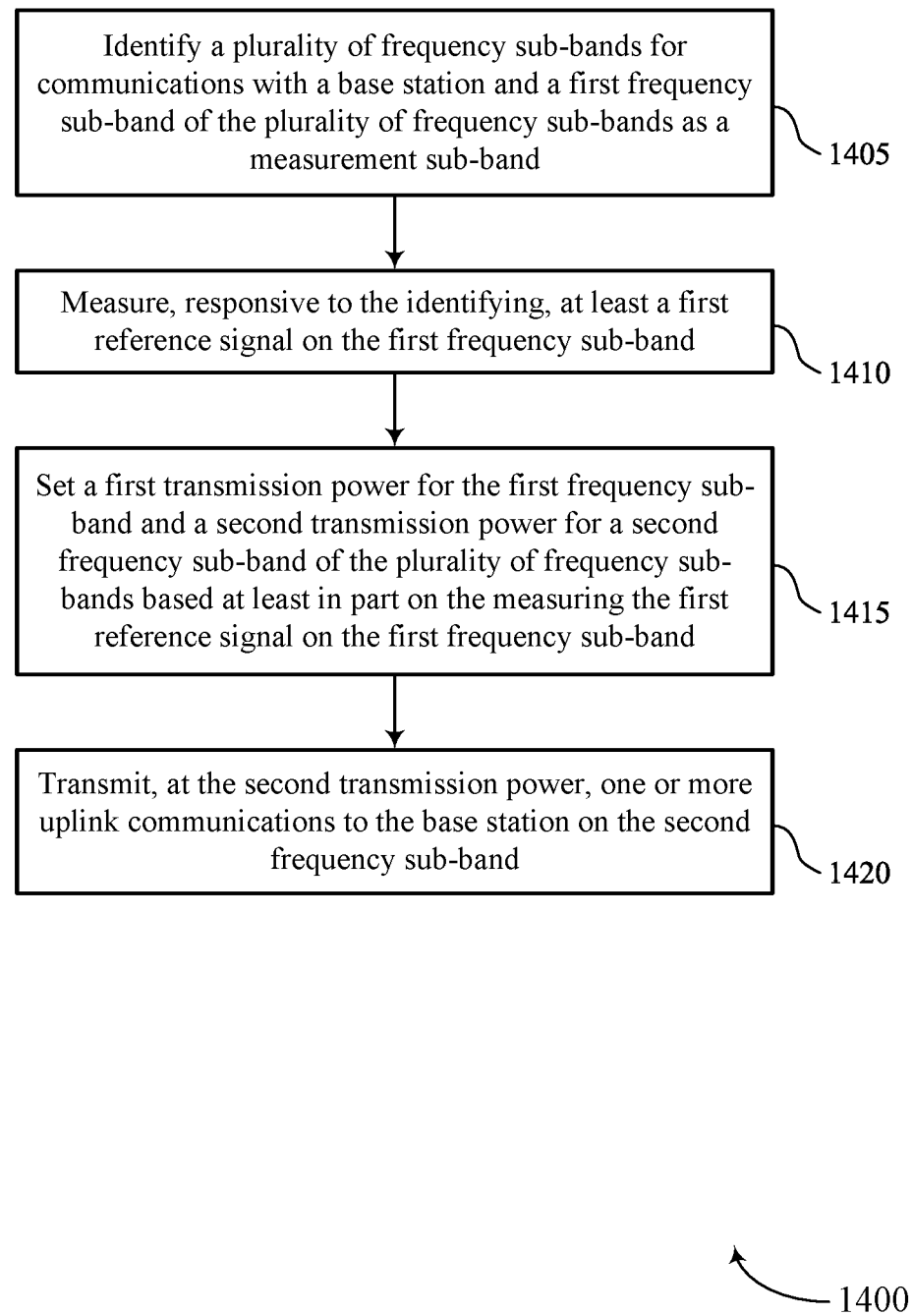
FIGS. 14 through 20 show flowcharts illustrating methods that support power control techniques for ultra-wide bandwidth beamforming systems in accordance with aspects of the present disclosure.

FIG. 14 shows a flowchart illustrating a method 1400 that supports power control techniques for ultra-wide bandwidth beamforming systems in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying a set of multiple frequency sub-bands for communications with a base station and a first frequency sub-band of the set of multiple frequency sub-bands as a measurement sub-band. The operations of 1405 may be performed in accordance with examples as disclosed herein. In some examples, aspects of the operations of 1405 may be performed by a band identification manager 825 as described with reference to FIG. 8.

At 1410, the method may include measuring, responsive to the identifying, at least a first reference signal on the first frequency sub-band. The operations of 1410 may be performed in accordance with examples as disclosed herein. In some examples, aspects of the operations of 1410 may be performed by a measurement manager 830 as described with reference to FIG. 8.

At 1415, the method may include setting a first transmission power for the first frequency sub-band and a second transmission power for a second frequency sub-band of the set of multiple frequency sub-bands based on the measuring the first reference signal on the first frequency sub-band. The operations of 1415 may be performed in accordance with examples as disclosed herein. In some examples, aspects of the operations of 1415 may be performed by a transmission power manager 835 as described with reference to FIG. 8.

At 1420, the method may include transmitting, at the second transmission power, one or more uplink communications to the base station on the second frequency sub-band. The operations of 1420 may be performed in accordance with examples as disclosed herein. In some examples, aspects of the operations of 1420 may be performed by a transmission power manager 835 as described with reference to FIG. 8.

Figure 15:
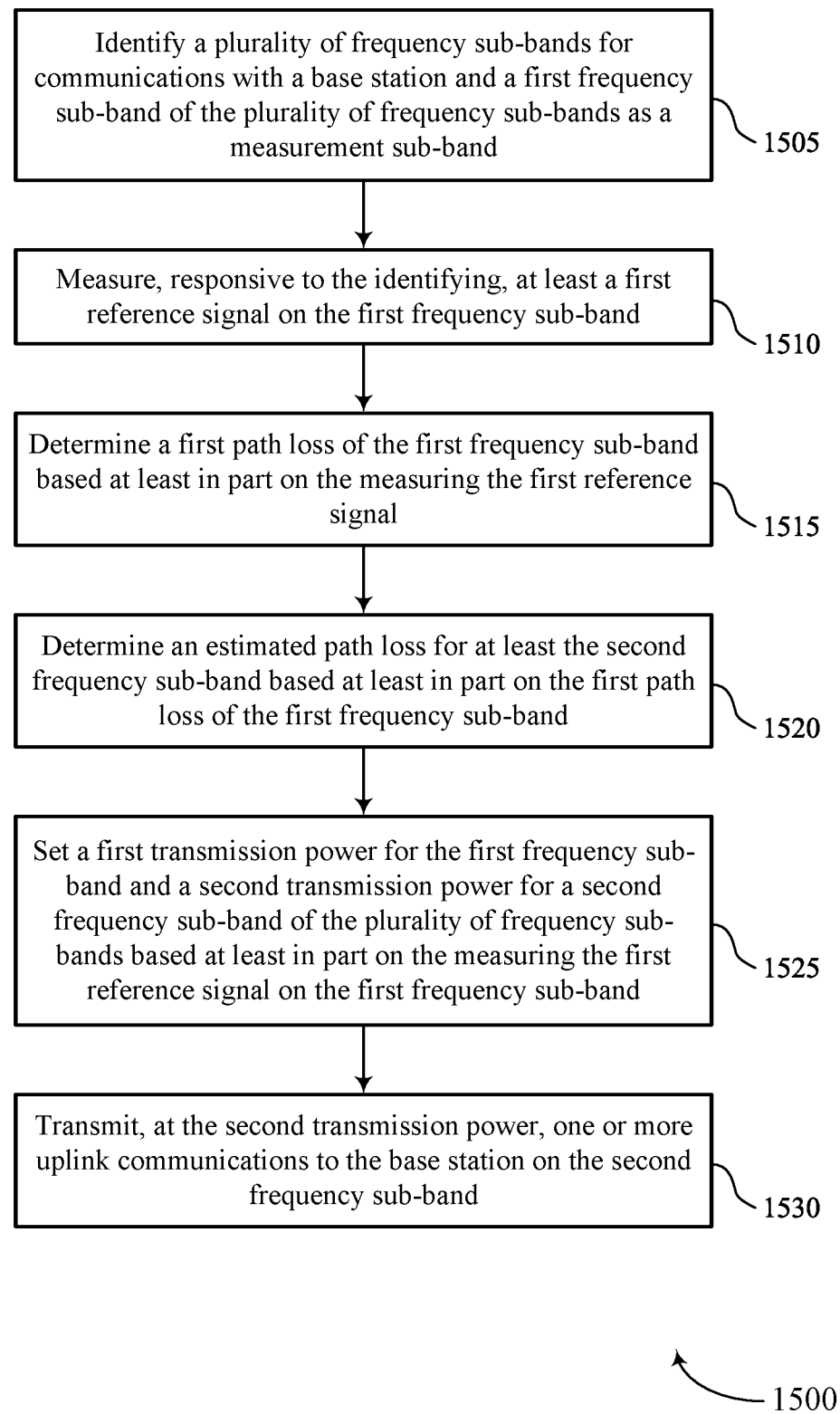

FIG. 15 shows a flowchart illustrating a method 1500 that supports power control techniques for ultra-wide bandwidth beamforming systems in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include identifying a set of multiple frequency sub-bands for communications with a base station and a first frequency sub-band of the set of multiple frequency sub-bands as a measurement sub-band. The operations of 1505 may be performed in accordance with examples as disclosed herein. In some examples, aspects of the operations of 1505 may be performed by a band identification manager 825 as described with reference to FIG. 8.

At 1510, the method may include measuring, responsive to the identifying, at least a first reference signal on the first frequency sub-band. The operations of 1510 may be performed in accordance with examples as disclosed herein. In some examples, aspects of the operations of 1510 may be performed by a measurement manager 830 as described with reference to FIG. 8.

At 1515, the method may include determining a first path loss of the first frequency sub-band based on the measuring the first reference signal. The operations of 1515 may be performed in accordance with examples as disclosed herein. In some examples, aspects of the operations of 1515 may be performed by a measurement manager 830 as described with reference to FIG. 8.

At 1520, the method may include determining an estimated path loss for at least the second frequency sub-band based on the first path loss of the first frequency sub-band. The operations of 1520 may be performed in accordance with examples as disclosed herein. In some examples, aspects of the operations of 1520 may be performed by a measurement manager 830 as described with reference to FIG. 8.

At 1525, the method may include setting a first transmission power for the first frequency sub-band and a second transmission power for a second frequency sub-band of the set of multiple frequency sub-bands based on the measuring the first reference signal on the first frequency sub-band. The operations of 1525 may be performed in accordance with examples as disclosed herein. In some examples, aspects of the operations of 1525 may be performed by a transmission power manager 835 as described with reference to FIG. 8.

At 1530, the method may include transmitting, at the second transmission power, one or more uplink communications to the base station on the second frequency sub-band. The operations of 1530 may be performed in accordance with examples as disclosed herein. In some examples, aspects of the operations of 1530 may be performed by a transmission power manager 835 as described with reference to FIG. 8.

Figure 16:
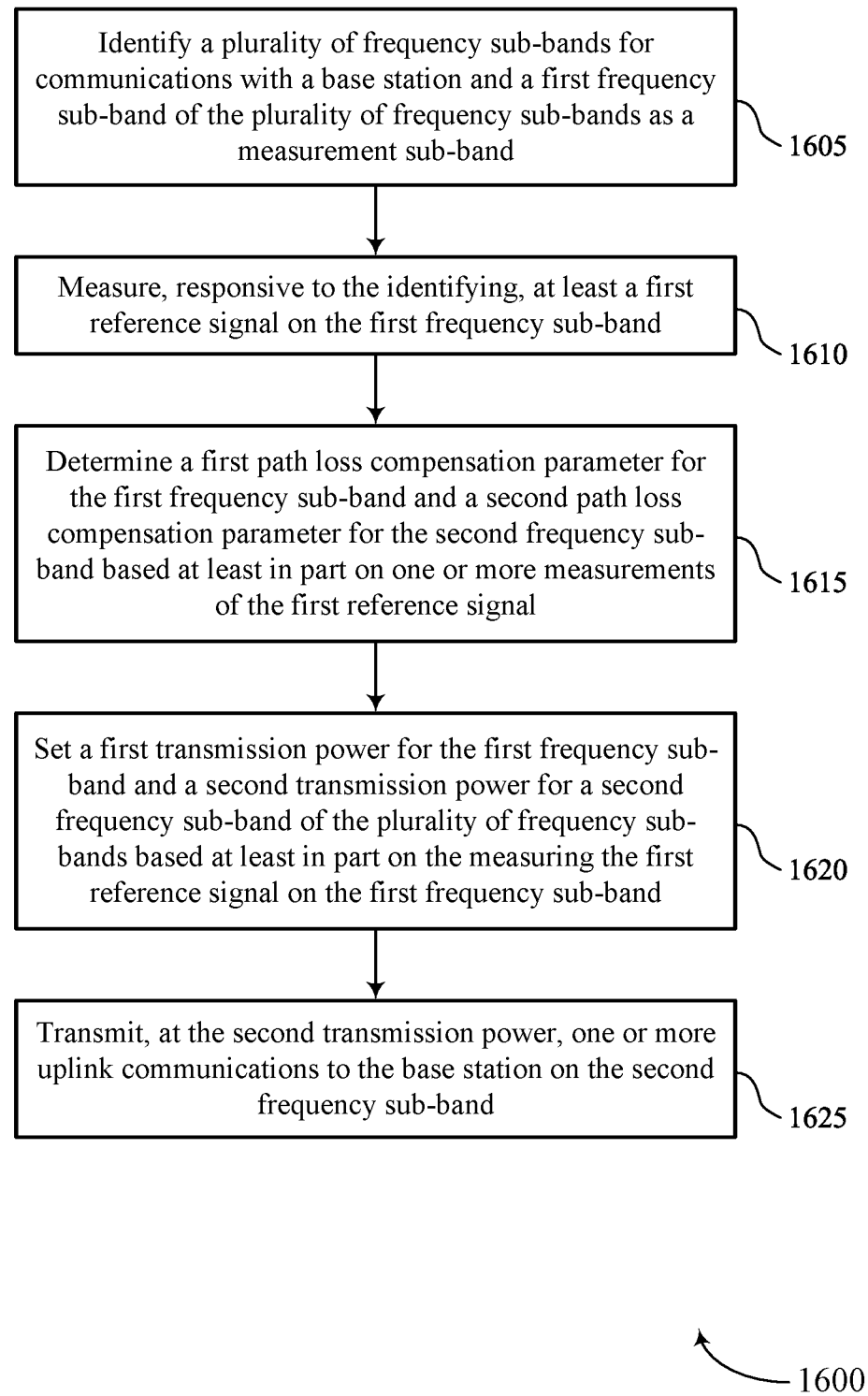

FIG. 16 shows a flowchart illustrating a method 1600 that supports power control techniques for ultra-wide bandwidth beamforming systems in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include identifying a set of multiple frequency sub-bands for communications with a base station and a first frequency sub-band of the set of multiple frequency sub-bands as a measurement sub-band. The operations of 1605 may be performed in accordance with examples as disclosed herein. In some examples, aspects of the operations of 1605 may be performed by a band identification manager 825 as described with reference to FIG. 8.

At 1610, the method may include measuring, responsive to the identifying, at least a first reference signal on the first frequency sub-band. The operations of 1610 may be performed in accordance with examples as disclosed herein. In some examples, aspects of the operations of 1610 may be performed by a measurement manager 830 as described with reference to FIG. 8.

At 1615, the method may include determining a first path loss compensation parameter for the first frequency sub-band and a second path loss compensation parameter for the second frequency sub-band based on one or more measurements of the first reference signal. The operations of 1615 may be performed in accordance with examples as disclosed herein. In some examples, aspects of the operations of 1615 may be performed by a measurement manager 830 as described with reference to FIG. 8.

At 1620, the method may include setting a first transmission power for the first frequency sub-band and a second transmission power for a second frequency sub-band of the set of multiple frequency sub-bands based on the measuring the first reference signal on the first frequency sub-band. The operations of 1620 may be performed in accordance with examples as disclosed herein. In some examples, aspects of the operations of 1620 may be performed by a transmission power manager 835 as described with reference to FIG. 8.

At 1625, the method may include transmitting, at the second transmission power, one or more uplink communications to the base station on the second frequency sub-band. The operations of 1625 may be performed in accordance with examples as disclosed herein. In some examples, aspects of the operations of 1625 may be performed by a transmission power manager 835 as described with reference to FIG. 8.

Figure 17:
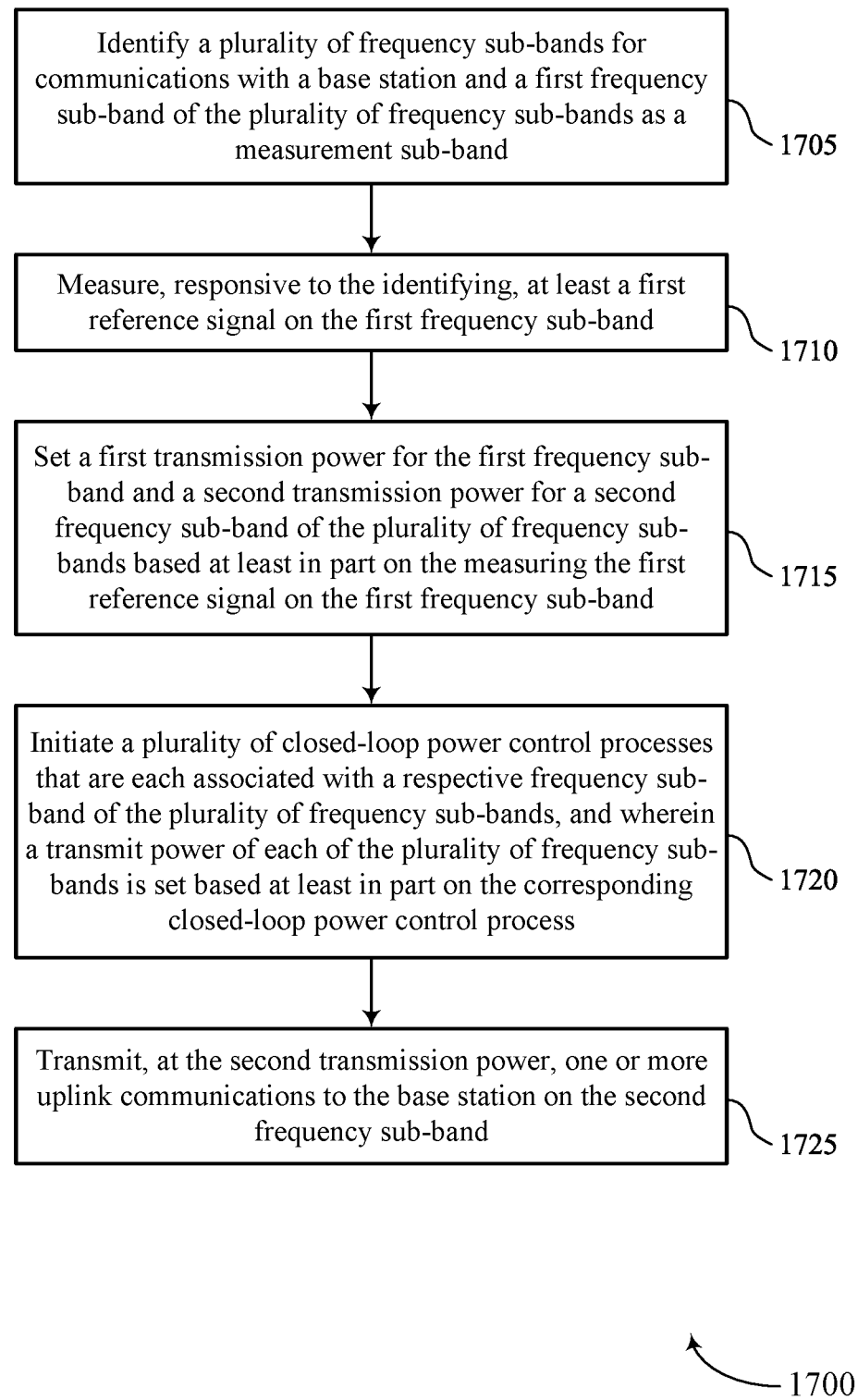

FIG. 17 shows a flowchart illustrating a method 1700 that supports power control techniques for ultra-wide bandwidth beamforming systems in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include identifying a set of multiple frequency sub-bands for communications with a base station and a first frequency sub-band of the set of multiple frequency sub-bands as a measurement sub-band. The operations of 1705 may be performed in accordance with examples as disclosed herein. In some examples, aspects of the operations of 1705 may be performed by a band identification manager 825 as described with reference to FIG. 8.

At 1710, the method may include measuring, responsive to the identifying, at least a first reference signal on the first frequency sub-band. The operations of 1710 may be performed in accordance with examples as disclosed herein. In some examples, aspects of the operations of 1710 may be performed by a measurement manager 830 as described with reference to FIG. 8.

At 1715, the method may include setting a first transmission power for the first frequency sub-band and a second transmission power for a second frequency sub-band of the set of multiple frequency sub-bands based on the measuring the first reference signal on the first frequency sub-band. The operations of 1715 may be performed in accordance with examples as disclosed herein. In some examples, aspects of the operations of 1715 may be performed by a transmission power manager 835 as described with reference to FIG. 8.

At 1720, the method may include initiating a set of multiple closed-loop power control processes that are each associated with a respective frequency sub-band of the set of multiple frequency sub-bands, and where a transmit power of each of the set of multiple frequency sub-bands is set based on the corresponding closed-loop power control process. The operations of 1720 may be performed in accordance with examples as disclosed herein. In some examples, aspects of the operations of 1720 may be performed by a closed-loop power control manager 845 as described with reference to FIG. 8.

At 1725, the method may include transmitting, at the second transmission power, one or more uplink communications to the base station on the second frequency sub-band. The operations of 1725 may be performed in accordance with examples as disclosed herein. In some examples, aspects of the operations of 1725 may be performed by a transmission power manager 835 as described with reference to FIG. 8.

Figure 18:
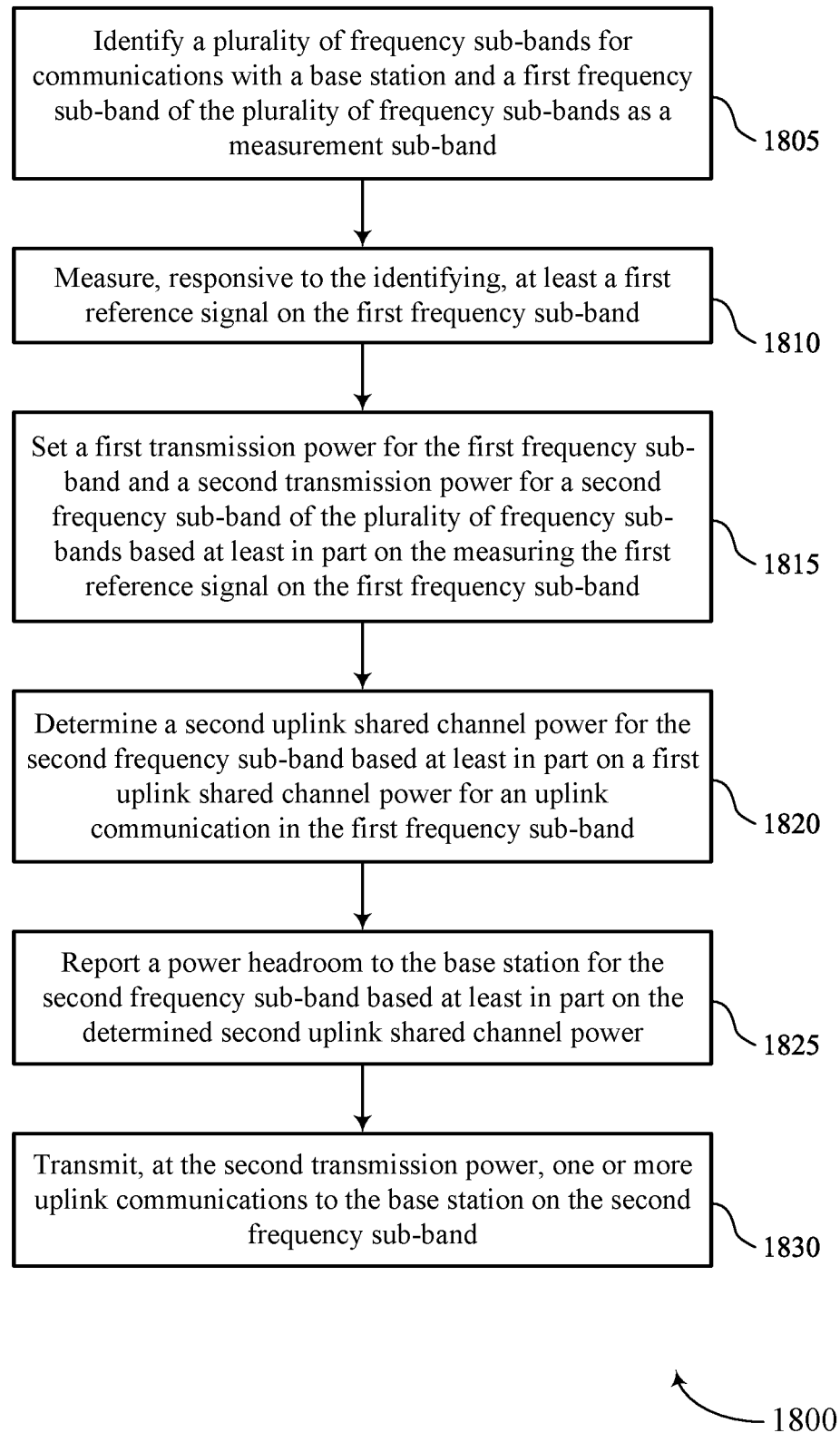

FIG. 18 shows a flowchart illustrating a method 1800 that supports power control techniques for ultra-wide bandwidth beamforming systems in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include identifying a set of multiple frequency sub-bands for communications with a base station and a first frequency sub-band of the set of multiple frequency sub-bands as a measurement sub-band. The operations of 1805 may be performed in accordance with examples as disclosed herein. In some examples, aspects of the operations of 1805 may be performed by a band identification manager 825 as described with reference to FIG. 8.

At 1810, the method may include measuring, responsive to the identifying, at least a first reference signal on the first frequency sub-band. The operations of 1810 may be performed in accordance with examples as disclosed herein. In some examples, aspects of the operations of 1810 may be performed by a measurement manager 830 as described with reference to FIG. 8.

At 1815, the method may include setting a first transmission power for the first frequency sub-band and a second transmission power for a second frequency sub-band of the set of multiple frequency sub-bands based on the measuring the first reference signal on the first frequency sub-band. The operations of 1815 may be performed in accordance with examples as disclosed herein. In some examples, aspects of the operations of 1815 may be performed by a transmission power manager 835 as described with reference to FIG. 8.

At 1820, the method may include determining a second uplink shared channel power for the second frequency sub-band based on a first uplink shared channel power for an uplink communication in the first frequency sub-band. The operations of 1820 may be performed in accordance with examples as disclosed herein. In some examples, aspects of the operations of 1820 may be performed by a transmission power manager 835 as described with reference to FIG. 8.

At 1825, the method may include reporting a power headroom to the base station for the second frequency sub-band based on the determined second uplink shared channel power. The operations of 1825 may be performed in accordance with examples as disclosed herein. In some examples, aspects of the operations of 1825 may be performed by an PHR manager 850 as described with reference to FIG. 8.

At 1830, the method may include transmitting, at the second transmission power, one or more uplink communications to the base station on the second frequency sub-band. The operations of 1830 may be performed in accordance with examples as disclosed herein. In some examples, aspects of the operations of 1830 may be performed by a transmission power manager 835 as described with reference to FIG. 8.

Figure 19:
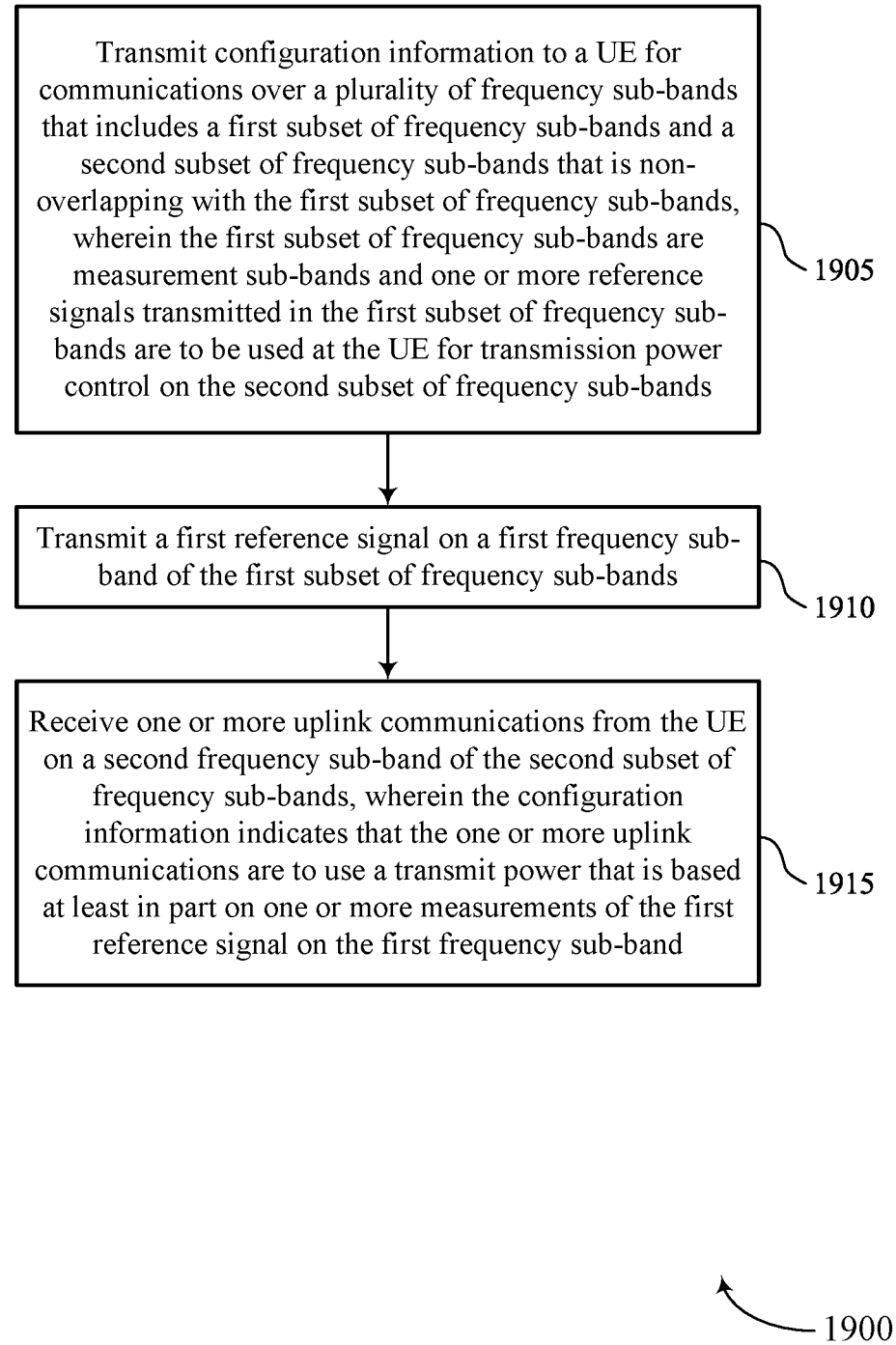

FIG. 19 shows a flowchart illustrating a method 1900 that supports power control techniques for ultra-wide bandwidth beamforming systems in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands. The operations of 1905 may be performed in accordance with examples as disclosed herein. In some examples, aspects of the operations of 1905 may be performed by a band configuration manager 1225 as described with reference to FIG. 12.

At 1910, the method may include transmitting a first reference signal on a first frequency sub-band of the first subset of frequency sub-bands. The operations of 1910 may be performed in accordance with examples as disclosed herein. In some examples, aspects of the operations of 1910 may be performed by a reference signal manager 1230 as described with reference to FIG. 12.

At 1915, the method may include receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band. The operations of 1915 may be performed in accordance with examples as disclosed herein. In some examples, aspects of the operations of 1915 may be performed by an uplink communications manager 1235 as described with reference to FIG. 12.

Figure 20:
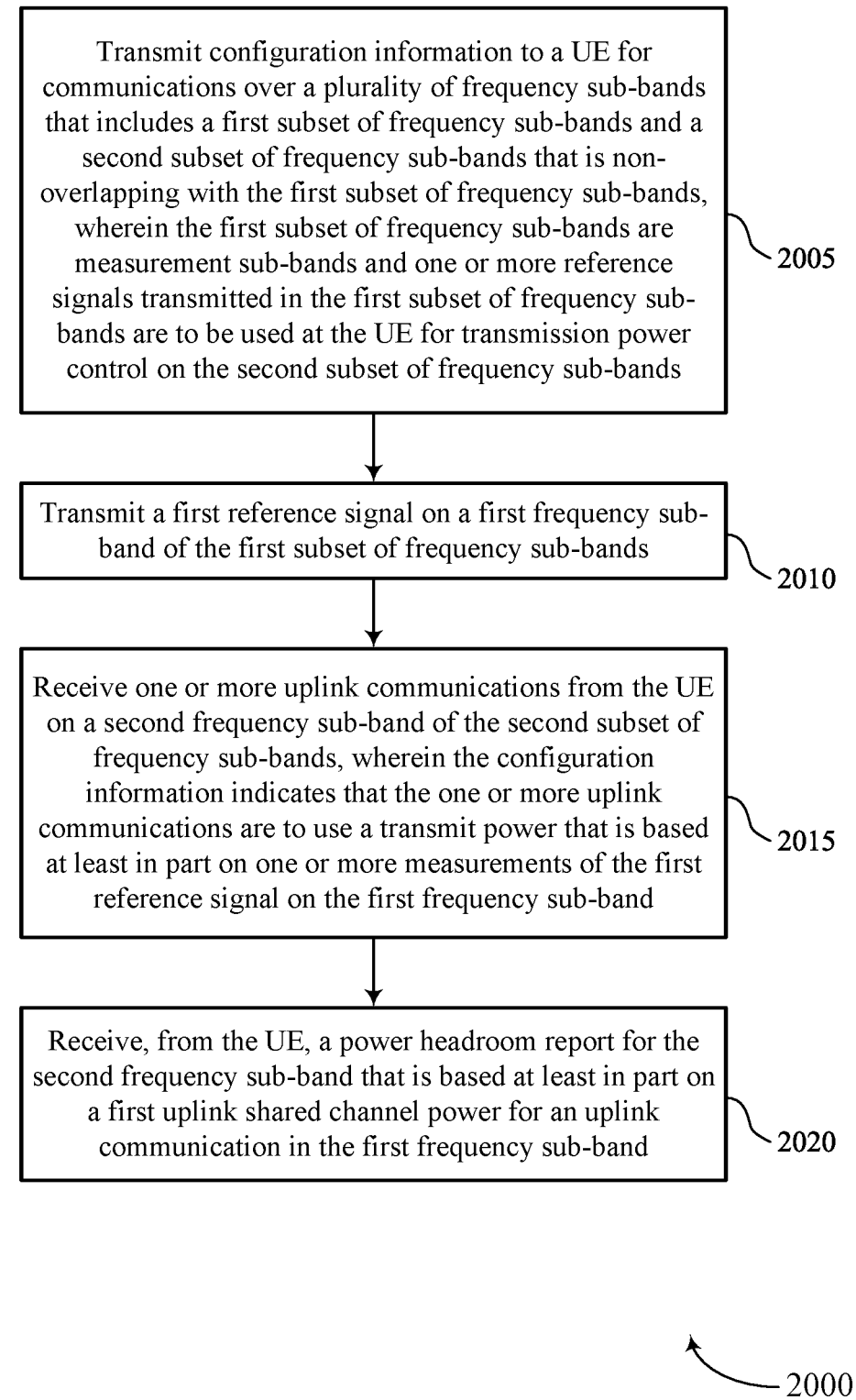

FIG. 20 shows a flowchart illustrating a method 2000 that supports power control techniques for ultra-wide bandwidth beamforming systems in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting configuration information to a UE for communications over a set of multiple frequency sub-bands that includes a first subset of frequency sub-bands and a second subset of frequency sub-bands that is non-overlapping with the first subset of frequency sub-bands, where the first subset of frequency sub-bands are measurement sub-bands and one or more reference signals transmitted in the first subset of frequency sub-bands are to be used at the UE for transmission power control on the second subset of frequency sub-bands. The operations of 2005 may be performed in accordance with examples as disclosed herein. In some examples, aspects of the operations of 2005 may be performed by a band configuration manager 1225 as described with reference to FIG. 12.

At 2010, the method may include transmitting a first reference signal on a first frequency sub-band of the first subset of frequency sub-bands. The operations of 2010 may be performed in accordance with examples as disclosed herein. In some examples, aspects of the operations of 2010 may be performed by a reference signal manager 1230 as described with reference to FIG. 12.

At 2015, the method may include receiving one or more uplink communications from the UE on a second frequency sub-band of the second subset of frequency sub-bands, where the configuration information indicates that the one or more uplink communications are to use a transmit power that is based on one or more measurements of the first reference signal on the first frequency sub-band. The operations of 2015 may be performed in accordance with examples as disclosed herein. In some examples, aspects of the operations of 2015 may be performed by an uplink communications manager 1235 as described with reference to FIG. 12.

At 2020, the method may include receiving, from the UE, a power headroom report for the second frequency sub-band that is based on a first uplink shared channel power for an uplink communication in the first frequency sub-band. The operations of 2020 may be performed in accordance with examples as disclosed herein. In some examples, aspects of the operations of 2020 may be performed by an PHR manager 1250 as described with reference to FIG. 12.

The following provides an overview of aspects of the present disclosure:

Aspect 1: A method for wireless communication at a UE, comprising: identifying a plurality of frequency sub-bands for communications with a base station and a first frequency sub-band of the plurality of frequency sub-bands as a measurement sub-band; measuring, responsive to the identifying, at least a first reference signal on the first frequency sub-band; setting a first transmission power for the first frequency sub-band and a second transmission power for a second frequency sub-band of the plurality of frequency sub-bands based at least in part on the measuring the first reference signal on the first frequency sub-band; and transmitting, at the second transmission power, one or more uplink communications to the base station on the second frequency sub-band.

Aspect 2: The method of aspect 1, further comprising: determining a first path loss of the first frequency sub-band based at least in part on the measuring the first reference signal; and determining an estimated path loss for at least the second frequency sub-band based at least in part on the first path loss of the first frequency sub-band.

Aspect 3: The method of any of aspects 1 through 2, wherein the one or more uplink communications include one or more of an uplink shared channel communication, an uplink control channel communication, a sounding reference signal communication, or any combinations thereof, that are scheduled on the second frequency sub-band.

Aspect 4: The method of any of aspects 1 through 3, wherein the first frequency sub-band is in a first subset of the plurality of frequency sub-bands that are measurement sub-bands, and the second frequency sub-band is in a second subset of the plurality of frequency sub-bands that is non-overlapping with the first subset of frequency sub-bands, and wherein measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands.

Aspect 5: The method of any of aspects 1 through 4, further comprising: determining a first path loss compensation parameter for the first frequency sub-band and a second path loss compensation parameter for the second frequency sub-band based at least in part on one or more measurements of the first reference signal.

Aspect 6: The method of any of aspects 1 through 5, further comprising: initiating a plurality of closed-loop power control processes that are each associated with a respective frequency sub-band of the plurality of frequency sub-bands, and wherein a transmit power of each of the plurality of frequency sub-bands is set based at least in part on the corresponding closed-loop power control process.

Aspect 7: The method of aspect 6, wherein the UE accumulates received transmit power control (TPC) commands into the closed-loop power control process associated with the frequency sub-band in which an uplink communication is scheduled.

Aspect 8: The method of aspect 7, wherein the received TPC commands include an indication of one or more of the plurality of closed-loop power control processes to which the TPC command is to be applied.

Aspect 9: The method of aspect 8, wherein the indication in the TPC commands indicates, based at least in part on the frequency sub-band in which the TPC command is received, that an associated TPC is to be applied to each of the plurality of closed-loop power control processes, to a subset of the plurality of closed-loop power control processes, or to one or more default closed-loop power control processes.

Aspect 10: The method of any of aspects 1 through 9, further comprising: determining a second uplink shared channel power for the second frequency sub-band based at least in part on a first uplink shared channel power for an uplink communication in the first frequency sub-band; and reporting a power headroom to the base station for the second frequency sub-band based at least in part on the determined second uplink shared channel power.

Aspect 11: The method of aspect 10, wherein the second uplink shared channel power is determined based at least in part on a set of configured default parameters and the first uplink shared channel power for the uplink communication in the first frequency sub-band.

Aspect 12: The method of aspect 11, wherein the second uplink shared channel power is determined based at least in part on a resource allocation of the uplink communication in the first frequency sub-band being applied to the second frequency sub-band.

Aspect 13: A method for wireless communication at a base station, comprising: transmitting configuration information to a UE for communications over a plurality of frequency sub-bands that includes a first subset of frequency sub-bands and a second subset of frequency sub-bands that is non-overlapping with the first subset of frequency sub-bands, wherein the first subset of frequency sub-bands are measurement sub-bands and one or more reference signals transmitted in the first subset of frequency sub-bands are to be used at the UE for transmission power control on the second subset of frequency sub-bands; transmitting a first reference signal on a first frequency sub-band of the first subset of frequency sub-bands; and receiving one or more uplink communications from the UE on a second frequency sub-band of the second subset of frequency sub-bands, wherein the configuration information indicates that the one or more uplink communications are to use a transmit power that is based at least in part on one or more measurements of the first reference signal on the first frequency sub-band.

Aspect 14: The method of aspect 13, wherein the configuration information further indicates that a first path loss of the first frequency sub-band is to be used to estimate a second path loss for at least the second frequency sub-band.

Aspect 15: The method of any of aspects 13 through 14, wherein the one or more uplink communications include one or more of an uplink shared channel communication, an uplink control channel communication, a sounding reference signal communication, or any combinations thereof, that are scheduled on the second frequency sub-band.

Aspect 16: The method of any of aspects 13 through 15, wherein the configuration information indicates that measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands.

Aspect 17: The method of any of aspects 13 through 16, wherein the configuration information indicates that a first path loss compensation parameter for the first frequency sub-band and a second path loss compensation parameter for the second frequency sub-band are to be based at least in part on one or more measurements of the first reference signal.

Aspect 18: The method of any of aspects 13 through 17, wherein the configuration information further provides for initiation of a plurality of closed-loop power control processes at the UE that are each associated with a respective frequency sub-band of the plurality of frequency sub-bands, and wherein a transmit power of each of the plurality of frequency sub-bands is set based at least in part on the corresponding closed-loop power control process.

Aspect 19: The method of aspect 18, wherein the configuration information further provides that the UE accumulates received transmit power control (TPC) commands into the closed-loop power control process associated with the frequency sub-band in which an uplink communication is scheduled.

Aspect 20: The method of aspect 19, wherein the TPC commands include an indication of one or more of the plurality of closed-loop power control processes to which the TPC command is to be applied.

Aspect 21: The method of aspect 20, wherein the indication in the TPC commands indicates, based at least in part on the frequency sub-band in which the TPC command is received, that an associated TPC is to be applied to each of the plurality of closed-loop power control processes, to a subset of the plurality of closed-loop power control processes, or to one or more default closed-loop power control processes.

Aspect 22: The method of any of aspects 13 through 21, further comprising: receiving, from the UE, a power headroom report for the second frequency sub-band that is based at least in part on a first uplink shared channel power for an uplink communication in the first frequency sub-band.

Aspect 23: The method of aspect 22, wherein the configuration information further includes a set of configured default parameters for determining a second uplink shared channel power based at least in part on the first uplink shared channel power for the first frequency sub-band.

Aspect 24: The method of aspect 23, wherein the second uplink shared channel power is determined based at least in part on a resource allocation of an uplink communication in the first frequency sub-band being applied to the second frequency sub-band.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying a plurality of frequency sub-bands for communications with an access network entity and a first frequency sub-band of the plurality of frequency sub-bands as a measurement sub-band;
    measuring, responsive to the identifying, at least a first reference signal on the first frequency sub-band;
    setting a first transmission power for the first frequency sub-band and a second transmission power for a second frequency sub-band of the plurality of frequency sub-bands based at least in part on the measuring the first reference signal on the first frequency sub-band wherein one or more measurements of the first reference signal are used to estimate one or more power parameters associated with the second transmission power; and
    transmitting, at the second transmission power, one or more uplink communications to the access network entity on the second frequency sub-band.

2. The method of claim 1, further comprising:
    determining a first path loss of the first frequency sub-band based at least in part on the measuring the first reference signal; and
    determining an estimated path loss for at least the second frequency sub-band based at least in part on the first path loss of the first frequency sub-band.

3. The method of claim 1, wherein the one or more uplink communications include one or more of an uplink shared channel communication, an uplink control channel communication, a sounding reference signal communication, or any combinations thereof, that are scheduled on the second frequency sub-band.

4. The method of claim 1, wherein:
    the first frequency sub-band is in a first subset of the plurality of frequency sub-bands that are measurement sub-bands, and the second frequency sub-band is in a second subset of the plurality of frequency sub-bands that is non-overlapping with the first subset of frequency sub-bands, and
    wherein measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands.

5. The method of claim 1, further comprising:
    determining a first path loss compensation parameter for the first frequency sub-band and a second path loss compensation parameter for the second frequency sub-band based at least in part on one or more measurements of the first reference signal.

6. The method of claim 1, further comprising:
    initiating a plurality of closed-loop power control processes that are each associated with a respective frequency sub-band of the plurality of frequency sub-bands, and wherein a transmit power of each of the plurality of frequency sub-bands is set based at least in part on the corresponding closed-loop power control process.

7. The method of claim 6, wherein the UE accumulates received transmit power control (TPC) commands into the closed-loop power control process associated with the frequency sub-band in which an uplink communication is scheduled.

8. The method of claim 7, wherein the received TPC commands include an indication of one or more of the plurality of closed-loop power control processes to which the TPC command is to be applied.

9. The method of claim 8, wherein the indication in the TPC commands indicates, based at least in part on the frequency sub-band in which the TPC command is received, that an associated TPC is to be applied to each of the plurality of closed-loop power control processes, to a subset of the plurality of closed-loop power control processes, or to one or more default closed-loop power control processes.

10. The method of claim 1, further comprising:
    determining a second uplink shared channel power for the second frequency sub-band based at least in part on a first uplink shared channel power for an uplink communication in the first frequency sub-band; and
    reporting a power headroom to the access network entity for the second frequency sub-band based at least in part on the determined second uplink shared channel power.

11. The method of claim 10, wherein the second uplink shared channel power is determined based at least in part on a set of configured default parameters and the first uplink shared channel power for the uplink communication in the first frequency sub-band.

12. The method of claim 11, wherein the second uplink shared channel power is determined based at least in part on a resource allocation of the uplink communication in the first frequency sub-band being applied to the second frequency sub-band.

13. A method for wireless communication at an access network entity, comprising:
    transmitting configuration information to a user equipment (UE) for communications over a plurality of frequency sub-bands that includes a first subset of frequency sub-bands and a second subset of frequency sub-bands that is non-overlapping with the first subset of frequency sub-bands, wherein the first subset of frequency sub-bands are measurement sub-bands and one or more reference signals transmitted in the first subset of frequency sub-bands are to be used at the UE for transmission power control on the second subset of frequency sub-bands;
    transmitting a first reference signal on a first frequency sub-band of the first subset of frequency sub-bands; and
    receiving one or more uplink communications from the UE on a second frequency sub-band of the second subset of frequency sub-bands, wherein the configuration information indicates that the one or more uplink communications are to use a transmit power that is based at least in part on one or more measurements of the first reference signal on the first frequency sub-band.

14. The method of claim 13, wherein the configuration information further indicates that a first path loss of the first frequency sub-band is to be used to estimate a second path loss for at least the second frequency sub-band.

15. The method of claim 13, wherein the one or more uplink communications include one or more of an uplink shared channel communication, an uplink control channel communication, a sounding reference signal communication, or any combinations thereof, that are scheduled on the second frequency sub-band.

16. The method of claim 13, wherein the configuration information indicates that measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands.

17. The method of claim 13, wherein the configuration information indicates that a first path loss compensation parameter for the first frequency sub-band and a second path loss compensation parameter for the second frequency sub-band are to be based at least in part on one or more measurements of the first reference signal.

18. The method of claim 13, wherein the configuration information further provides for initiation of a plurality of closed-loop power control processes at the UE that are each associated with a respective frequency sub-band of the plurality of frequency sub-bands, and wherein a transmit power of each of the plurality of frequency sub-bands is set based at least in part on the corresponding closed-loop power control process.

19. The method of claim 18, wherein the configuration information further provides that the UE accumulates received transmit power control (TPC) commands into the closed-loop power control process associated with the frequency sub-band in which an uplink communication is scheduled.

20. The method of claim 19, wherein the TPC commands include an indication of one or more of the plurality of closed-loop power control processes to which the TPC command is to be applied.

21. The method of claim 20, wherein the indication in the TPC commands indicates, based at least in part on the frequency sub-band in which the TPC command is received, that an associated TPC is to be applied to each of the plurality of closed-loop power control processes, to a subset of the plurality of closed-loop power control processes, or to one or more default closed-loop power control processes.

22. The method of claim 13, further comprising:
    receiving, from the UE, a power headroom report for the second frequency sub-band that is based at least in part on a first uplink shared channel power for an uplink communication in the first frequency sub-band.

23. The method of claim 22, wherein the configuration information further includes a set of configured default parameters for determining a second uplink shared channel power based at least in part on the first uplink shared channel power for the first frequency sub-band.

24. The method of claim 23, wherein the second uplink shared channel power is determined based at least in part on a resource allocation of an uplink communication in the first frequency sub-band being applied to the second frequency sub-band.

25. An apparatus for wireless communication at a user equipment (UE), comprising:
    a processor;
    memory coupled with the processor; and
    instructions stored in the memory and executable by the processor to cause the apparatus to:
        identify a plurality of frequency sub-bands for communications with an access network entity and a first frequency sub-band of the plurality of frequency sub-bands as a measurement sub-band;
        measure, responsive to the identifying, at least a first reference signal on the first frequency sub-band;
        set a first transmission power for the first frequency sub-band and a second transmission power for a second frequency sub-band of the plurality of frequency sub-bands based at least in part on the measuring the first reference signal on the first frequency sub-band, wherein one or more measurements of the first reference signal are used to estimate one or more power parameters associated with the second transmission power; and
        transmit, at the second transmission power, one or more uplink communications to the access network entity on the second frequency sub-band.

26. The apparatus of claim 25, wherein the instructions are further executable by the processor to cause the apparatus to:
    determine a first path loss of the first frequency sub-band based at least in part on the measuring the first reference signal; and
    determine an estimated path loss for at least the second frequency sub-band based at least in part on the first path loss of the first frequency sub-band.

27. The apparatus of claim 25, wherein the instructions are further executable by the processor to cause the apparatus to:
    initiate a plurality of closed-loop power control processes that are each associated with a respective frequency sub-band of the plurality of frequency sub-bands, and wherein a transmit power of each of the plurality of frequency sub-bands is set based at least in part on the corresponding closed-loop power control process;

determine a second uplink shared channel power for the second frequency sub-band based at least in part on a first uplink shared channel power for an uplink communication in the first frequency sub-band; and report a power headroom to the access network entity for the second frequency sub-band based at least in part on the determined second uplink shared channel power.

28. An apparatus for wireless communication at an access network entity, comprising:

a processor;

memory coupled with the processor; and instructions stored in the memory and executable by the processor to cause the apparatus to:

transmit configuration information to a user equipment (UE) for communications over a plurality of frequency sub-bands that includes a first subset of frequency sub-bands and a second subset of frequency sub-bands that is non-overlapping with the first subset of frequency sub-bands, wherein the first subset of frequency sub-bands are measurement sub-bands and one or more reference signals transmitted in the first subset of frequency sub-bands are to be used at the UE for transmission power control on the second subset of frequency sub-bands;

transmit a first reference signal on a first frequency sub-band of the first subset of frequency sub-bands; and receive one or more uplink communications from the UE on a second frequency sub-band of the second subset of frequency sub-bands, wherein the configuration information indicates that the one or more uplink communications are to use a transmit power that is based at least in part on one or more measurements of the first reference signal on the first frequency sub-band.

29. The apparatus of claim 28, wherein the configuration information indicates that measurements associated with the first frequency sub-band are used to estimate one or more power parameters for the second frequency sub-band and measurements associated with a third frequency sub-band of the first subset of frequency sub-bands are used to estimate one or more power parameters for a fourth frequency sub-band of the second subset of frequency sub-bands.

30. The apparatus of claim 28, wherein the configuration information further provides for initiation of a plurality of closed-loop power control processes at the UE that are each associated with a respective frequency sub-band of the plurality of frequency sub-bands, and wherein a transmit power of each of the plurality of frequency sub-bands is set based at least in part on the corresponding closed-loop power control process; and wherein the instructions are further executable by the processor to cause the apparatus to receive, from the UE, a power headroom report for the second frequency sub-band that is based at least in part on a first uplink shared channel power for an uplink communication in the first frequency sub-band.

* * * * *